US007394771B2

(12) United States Patent
Nakano et al.

(10) Patent No.: US 7,394,771 B2
(45) Date of Patent: Jul. 1, 2008

(54) APPARATUS AND METHOD FOR DATA COMMUNICATION INCLUDING ESTABLISHING COMMUNICATION USING TONE SIGNAL

(75) Inventors: Daisuke Nakano, Hirakata (JP); Kazuyuki Sumi, Nara (JP); Takashi Nishimura, Tenri (JP); Yuji Ichikawa, Tenri (JP); Fumihiro Fukae, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 1139 days.

(21) Appl. No.: 10/271,585

(22) Filed: Oct. 17, 2002

(65) Prior Publication Data

US 2004/0076193 A1   Apr. 22, 2004

(51) Int. Cl.
*H04L 12/28* (2006.01)
*H04B 10/24* (2006.01)

(52) U.S. Cl. .................. 370/254; 370/276; 370/437; 370/526; 398/25; 398/42

(58) Field of Classification Search ................ 370/526; 398/41, 52, 25
See application file for complete search history.

(56) References Cited

U.S. PATENT DOCUMENTS 5,050,952 A * 9/1991 Fussgäger .................... 398/44
5,212,577 A * 5/1993 Nakamura et al. ............ 398/79
5,317,441 A * 5/1994 Sidman ........................ 398/41
6,169,746 B1 * 1/2001 Ueda et al. .................. 370/466
6,802,030 B2 * 10/2004 Nakano et al. ................ 714/43
7,076,175 B2 * 7/2006 Bourgart .................. 398/167.5

FOREIGN PATENT DOCUMENTS

JP          05-276184 A      10/1993

* cited by examiner

*Primary Examiner*—Wing Chan
*Assistant Examiner*—Brian Roberts
(74) *Attorney, Agent, or Firm*—Birch, Stewart, Kolasch & Birch, LLP

(57) ABSTRACT

In optical two-way communication using a single optical fiber, part of the light transmitted from an apparatus is received as stray light by the apparatus itself. This occasionally hampers accurate detection of disconnection from the partner apparatus and of the start of data communication by the partner apparatus after the establishment of connection. To overcome this, the timing with which an apparatus transmits a tone signal after the establishment of connection is compared with the timing with which the apparatus receives a tone signal from the partner apparatus, and the two apparatuses use different sets of data transmission properties (for example, different wavelengths) to accurately detect disconnection. Moreover, based on the properties of the received light and the characteristics of the receiving amplifier, repetition of the same code for longer than a predetermined period is detected to accurately detect disconnection. Furthermore, in response to a request for data communication after the establishment of connection, a tone signal having a different pattern from that used to establish connection is used to accurately detect the start of data communication.

16 Claims, 23 Drawing Sheets

APPARATUS AND METHOD FOR DATA COMMUNICATION INCLUDING ESTABLISHING COMMUNICATION USING TONE SIGNAL

BACKGROUND OF THE INVENTION

1. Field of the Invention

The present invention relates to a data communication apparatus used in communication using an optical fiber as a data transmission medium.

2. Description of the Prior Art

The IEEE Std. 1394-1995 (hereinafter IEEE1394) has been receiving widespread attention as a data communication method between digital home information appliances. As a complement to IEEE1394, the IEEE Std. 1394a-2000 (hereinafter IEEE1394a) aims at higher communication efficiency and lower power consumption, and a draft standard called p1394b tackles faster data rates over longer distances.

Tone Signals and Data Signals

According to p1394b, which is an example of optical two-way communication (full-duplex communication) using two optical fibers, connection between apparatuses is established by exchanging tone signals, and, after the establishment of connection, a data signal starts being transmitted when a request for communication occurs in one of the apparatuses. On the other hand, according to IEEE1394a, when no communication with a partner apparatus takes place after the establishment of connection, a suspended state (a connection-established state) is maintained by canceling the request for data communication to achieve low power consumption.

Detection of Disconnection Based on SD Signal

According to the standard p1394b, a binary signal called SD (signal detect) is used to detect disconnection between apparatuses. The SD signal is a signal that remains active while a tone signal is being oscillated and while a normal data signal is being received. When apparatuses are disconnected from each other as a result of physical disconnection or power-down, the SD signal becomes non-active, and this permits easy detection of disconnection.

Detection of Start of Communication Based on SD Signal

Moreover, when a transmitted signal is switched from a tone signal to a continuous data communication signal, the SD signal becomes continuously active. By detecting this, the receiving side can easily detect the starting of data communication by the communication partner.

Use of a Single Optical Fiber

While, as described above, p1394b is optical two-way communication using two optical fibers, there is observed a trend toward the realization of optical two-way communication (single-fiber full-duplex communication) using a single optical fiber for cost reduction and space saving.

Reason for Difficulty in Detecting Disconnection Based on SD Signal

However, in optical two-way communication using a single optical fiber, a light-emitter cannot be optically separated from a light-receiver, and therefore the light receiver of one apparatus (hereinafter the home apparatus) receives not only the light (partner light) transmitted from another apparatus (hereinafter the partner apparatus) but also part (stray light) of the light transmitted from the light-emitter of the home apparatus itself toward the partner apparatus. As a result, even when the two apparatuses are disconnected from each other, the stray light so received may keep the SD signal active. This occasionally makes it impossible to detect disconnection on the basis of the value of the SD signal alone.

Reason for Difficulty in Detecting Start of Communication Based on SD Signal

Moreover, when the home apparatus starts data communication first, the received stray light may make the SD signal active. This occasionally makes it impossible to detect the starting of data communication by the partner apparatus thereafter on the basis of the value of the SD signal alone.

Reason for Difficulty in Maintaining Connection-Established State

Moreover, after a transition from a state in which two communication apparatuses are transferring data to a connection-established state resulting from simultaneous cancellation of requests for data transfer in both apparatuses, even though the apparatuses try to maintain the connection-established state by exchanging tone signals, if the home apparatus transmits a tone signal at almost the same time as the partner apparatus transmits a tone signal, the home apparatus cannot distinguish whether the received tone signal is from the partner apparatus or from the home apparatus itself. This makes it impossible to maintain the connection-established state, occasionally causing an unwanted transition to a disconnected state.

Reason for Difficulty in Shifting from Disconnected State to Connection-Established State Moreover, during a transition from a disconnected state to a connection-established state resulting from recognition of the partner apparatus through exchange of tone signals, if the tone signals used have a fixed period, once the tone signal from the home apparatus overlaps with the tone signal from the partner apparatus, the stray light makes it impossible for the home apparatus to distinguish, by the method of detecting tone signals on the basis of the SD signal, whether the tone signal received is from the partner apparatus or from the home apparatus itself. This makes it impossible to detect the tone signal of the partner apparatus. As a result, no transition to a connection-established state ever takes place, with a disconnected state maintained for ever.

SUMMARY OF THE INVENTION

Accordingly, an object of the present invention is to provide a communication apparatus that can accurately detect disconnection and starting of data communication in optical two-way communication using a single optical fiber. Another object of the present invention to provide a communication apparatus that can accurately detect establishment of connection and maintaining of a connection-established state in optical two-way communication using a single optical fiber.

To achieve the above objects, the present invention relies on the following means.

First, the means for accurately detecting disconnection will be described.

System in Which SD Signal Does Not Detect Stray Light

The reason for the occasional failure to detect disconnection in optical two-way communication using a single optical fiber is that the light from the partner apparatus cannot be expressly distinguished from the stray light. Accordingly, if two apparatuses are made to transmit light having different properties (for example, different wavelengths), the light from the partner apparatus can be distinguished from the stray light. This makes it possible to produce an SD signal that becomes non-active whenever the partner apparatus stops emitting light just as where two optical fibers are used and thereby detect disconnection.

Necessity to Determine Parent and Child

However, if the properties of the light emitted by each apparatus for transmission are determined apparatus by apparatus, it is difficult to guarantee that any two apparatuses that happen to be connected will use light having different properties for transmission to each other. Therefore, every apparatus needs to be so configured as to be able to transmit at least two types of light having different properties for transmission so that any two apparatuses, when establishing connection, negotiate with each other and select the types of light having different properties from each other for mutual transmission.

According to p1394b, the parent-child relationship between individual apparatuses is determined in the context of an entire bus. Thus, apparently, which type of light to use for transmission can be determined on the basis of that parent-child relationship. However, according to p1394b, a parent-child relationship is determined only after the establishment of connection between individual apparatuses, and therefore, before that, it is impossible to determine which type of light to use for transmission. Moreover, according to p1394b, individual apparatuses are not given semi-fixed IDs, and therefore, immediately after physical connection or power-up, the apparatuses cannot distinguish one another. Thus, it is impossible to determine which apparatus should use which type of light.

Accordingly, in a method for detecting disconnection relying on two apparatuses using light having different properties from each other for transmission, during the period after physical connection until the establishment of connection, the apparatuses need, first, to establish connection by using light having identical properties and then, when connection is established, to quickly determine the parent-child relationship between them (which need not coincide with that determined by p1394b) so that the parent and child apparatuses use light having different properties for mutual transmission.

Method for Determining Parent-Child Relationship 1

As one way to determine the parent-child relationship between two apparatuses as soon as connection is established, according to a first embodiment of the invention, when the connection is established through the exchange of tone signals, a local parent-child relationship is determined, immediately after the establishment of connection, according to whether the home apparatus receives a tone from the partner apparatus before or after the home apparatus transmits a tone.

This method is easy to implement, but occasionally fails to determine a parent-child relationship when the two apparatuses transmit tone signals almost at the same time.

Method for Determining Parent-Child Relationship 2

As another way to determine the parent-child relationship between two apparatuses as soon as connection is established, according to a second embodiment of the invention, in a method for establishing connection when the home apparatus receives the tone from the partner in the manner described above, two time regions, called the parent region and the child region respectively, are secured within the time period until the establishment of connection, and whether the home apparatus is a parent or child apparatus is determined according to in which of those time regions the home apparatus receives the tone from the partner apparatus.

This method permits accurate determination of a parent-child relationship as long as appropriate measures are taken to prevent continuous detection of the tone of the partner apparatus over the parent and child regions, as by securing between those time regions a dead region in which no reception of a tone takes place.

Method of Detecting Disconnection Based on Repetition of the Same Code

According to a third embodiment of the invention, instead of determining a parent-child relationship and using light of different properties for transmission as described above, disconnection is detected on the basis of a received signal and a receiving amplifier.

Usually, a tone signal is transmitted intermittently, and a data signal transmitted after the start of data communication is so coded, as by 8B10B coding, that the same code ("0" or "1") does not persist for longer than a predetermined period. Accordingly, while a receiving amplifier is receiving the light from the partner apparatus, the received light never keeps conveying the same code for longer than the predetermined period.

On the other hand, the stray light has a lower level than the partner light, and therefore, in the transient state after the ceasing of the partner light resulting from disconnection until an influence of the stray light starts appearing in the output of the binarizing circuit in response to a variation in the direct-current component, the same code is detected continuously depending on the characteristics of the receiving amplifier. By exploiting the fact that this continuous period is longer than the predetermined period mentioned above, it is possible to detect disconnection.

Next, the means for accurately detecting the start of data communication will be described.

System in Which SD Signal Does Not Detect Stray Light

As described earlier, by making two apparatuses use light having different properties (for example, different wavelengths) for transmission, it is possible to distinguish the partner light from the stray light. This makes it possible to produce an SD signal that becomes non-active when the partner apparatus stops emitting light just as where two optical fibers are used, and thus to detect the start of data communication.

Method of Detecting Start of Communication Based on Different Tone Signals

According to a fourth embodiment of the invention, instead of determining a parent-child relationship and using light of different properties for transmission as described above, the start of communication is notified through exchange of predetermined tone signals different from those used to establish connection.

When a communication apparatus (called the apparatus A) receives a request for starting data communication from within itself, it outputs a tone signal different from the one used to establish connection. For example, for the establishment of connection, the apparatus A transmits an on-off signal of about 50 MHz for 1 ms, and then stops transmission for the following 63 ms. The apparatus A repeats this. On receiving a request for starting data communication, for the establishment of connection, the apparatus A transmits an on-off signal of about 50 HMz for 3 ms, and then stops transmission for the following 61 ms. For easy understanding, the following descriptions assume the use of these tone signals, though any different tone signals may be used instead.

The partner communication apparatus (called the apparatus B), by detecting a tone signal longer than 1 ms on the basis of the SD signal, can recognize that the apparatus A is waiting for a request for starting communication. In response to a long tone signal, the apparatus B, after receiving a request for starting communication from within itself, starts transmitting a continuous data communication signal. The apparatus B may, before that, transmit a tone signal lasting for 3 ms.

Since the apparatus A transmits the tone signal intermittently, while it is not transmitting the tone signal, it can detect, on the basis of the SD signal, whether the apparatus B is transmitting a continuous data communication signal or not. When the apparatus A recognizes that the SD signal has remained active for a sufficiently long period, it starts transmitting a continuous data communication signal in a similar manner.

By this method, even if the SD signal detects transmission from within an apparatus, it is possible to detect the start of mutual communication on the basis of the same SD signal.

Method for Determining Parent-Child Relationship 3

First, the tone signals used will be defined. In the following descriptions, the tone signal used to establish connection will be called the first tone signal, and a tone signal having a different length from the first tone signal will be called the second tone signal. In the embodiments described hereinafter, the first tone signal is a short tone signal, and the second tone signal is a long tone signal. However, the first and second tone signals may have any other lengths as long as they have different lengths.

As a method for determining a parent-child relationship by using two types of tone signal as described above, according to a fifth embodiment of the invention, first, in the initial state before the establishment of connection, two communication apparatuses both operate as child apparatuses. Even after the establishment of connection as a result of the exchange of the first tone signal, the two communication apparatuses continue operating as child apparatuses in the initial state. Then, the communication apparatus that transmits the second tone signal first in response to a request for data communication from within itself will thereafter be regarded as the parent apparatus.

In this method, when connection is established as a result of the two communication apparatuses mutually transmitting the first tone signal, the two communication apparatuses are notified of a request for data communication by the second tone signal different from the first tone signal used to establish connection, and thereby the parent-child relationship between them is determined. This permits a parent-child relationship to be determined without fail.

Method for Determining Parent-Child Relationship 4

As another method for determining a parent-child relationship by using two types of tone signal, according to a sixth embodiment of the invention, as in the method for determining the parent-child relationship 3 described earlier, two communication apparatuses operate as child apparatuses in the initial state even after the establishment of connection as a result of the exchange of the first tone signal. Then, when the second tone signal is generated to achieve a transition to a data-communication-enabled state, the communication apparatus that transmits the second tone signal first is regarded as a provisional parent apparatus, and the communication apparatus that receives the second tone signal first is regarded as a provisional child apparatus. Then, the communication apparatus regarded as a provisional child apparatus, on receiving a request for data communication within itself, transmits a continuous signal as a data signal, and is then regarded as a definite child apparatus. On the other hand, the communication apparatus regarded as a provisional parent apparatus, on receiving a continuous signal as a data signal, is regarded as a definite parent apparatus.

In this method, even when a fault in the communication path causes both of the two communication apparatuses to be regarded as provisional parent apparatuses, the one that receives the second tone signal first is then regarded as a provisional child apparatus. Thus, it is possible to determine a parent-child relationship without fail when continuous signals are exchanged as data signals.

Method for Exchanging Tone Signals at End of Data Communication 1

According to a seventh embodiment of the invention, to permit tone signals to be exchanged without fail between two communication apparatuses at the end of data communication, the tone signals are transmitted with shifted timing according to the parent-child relationship determined on the occasion of a transition to a data-transfer-enabled state.

During a transition from the data-transfer-enabled state to a connection-established state as a result of the request for data transfer being cancelled, for example, if the home apparatus has been regarded as a parent apparatus, it immediately starts transmitting a tone signal and, if it has been regarded as a child apparatus, it starts transmitting a tone signal with a delay of half the period of the tone signal. In this way, when two communication apparatuses that have thus far been performing data communication with each other go into a connection-established state at the same time, it is possible to prevent the first tone signals transmitted from the two communication apparatuses to overlap with each other. This makes it possible to detect the tone signals on the basis of the SD signal, and thus to maintain the connection-established state. The tone signals transmitted after the end of data communication may be transmitted with the reverse timing compared with the example specifically described above.

Method for Exchanging Tone Signals at End of Data Communication 2

According to an eighth embodiment of the invention, as another way to permit tone signals to be exchanged without fail between two communication apparatuses at the end of data communication, the tone signals are transmitted with shifted timing according to, as well as the parent-child relationship determined on the occasion of a transition to a data-transfer-enabled state, the state of the SD signal at the end of data communication.

In this method, after a transition from the data-transfer-enabled state to a connection-established state, first, each apparatus waits for the SD signal to become non-active and thereby detects that the partner apparatus has shifted from the data-transfer-enabled state to a connection-established state. After both communication apparatuses are confirmed to have shifted to a connection-established state in this way, the parent and child apparatuses each transmit the tone signal with different timing. Here, the tone signals may be transmitted, for example as described above, in such a way that, if the home apparatus has been regarded as a parent apparatus, it immediately starts transmitting a tone signal and, if it has been regarded as a child apparatus, it starts transmitting a tone signal with a delay of half the period of the tone signal.

By this method, with whatever timing the two communication apparatuses shift from the data-transfer-enabled state to the connection-established state, it is possible to exchange tone signals between the two communication apparatuses without fail after the end of data communication.

Method for Exchanging Tone Signals During Transition from Disconnected State to Connection-Established State According to a ninth embodiment of the invention, to permit tone signals to be exchanged between two communication apparatuses without fail during a transition from a disconnected state to a connection-established state, as after power-up, the tone signals are transmitted with their periods shifted.

For the fundamental period T of a given tone signal, two or more periods are determined in the range of from T−α to T+β (where $0 \leq \alpha \leq T$ and $0 \leq \beta \leq T$), and, until the tone signal from the partner apparatus is received, each apparatus, every time it transmits a tone signal, randomly chooses a different one of those two or more periods and transmits the tone signal with the selected period. After each apparatus recognizes the reception of the tone signal from the partner apparatus on the basis of the SD signal, it transmits its own tone signal in such a way that this tone signal does not overlap with the tone signal from the partner apparatus.

By this method, during a transition from a disconnected state to a connection-established state as after power-up, it is possible to transmit the tone signals from two communication apparatuses with their periods shifted. This permits the tone signals to be transmitted with shifted timing and thus exchanged without fail. Moreover, it is possible to reduce the time required for a transition from a disconnected state to a connection-established state.

More Specific Means for Achieving the Objects

On the basis of the means described above, the objects stated earlier are achieved, more specifically, by the use of communication apparatuses described below.

According to one aspect of the present invention, in a communication apparatus (A) that establishes connection with another communication apparatus (B) through exchange of tone signals, the communication apparatus (A) is provided with a function of comparing the time point at which the communication apparatus (A) transmits a first tone signal with the time point at which the communication apparatus (A) receives a first tone signal from the communication apparatus (B) and then determining, according to which of the time points is earlier, which to use of the two sets of transmission properties with which the communication apparatus (A) is provided.

According to another aspect of the present invention, in a communication apparatus (A) that establishes connection with another communication apparatus (B) through exchange of tone signals, at least two time periods are secured within the time interval after the communication apparatus (A) transmits one tone signal until it transmits the next tone signal, and the communication apparatus (A) is provided with a function of detecting in which of the two time periods it receives a tone signal from the communication apparatus (B) and then determining, according to which of the two time periods is detected, which to use of the two sets of transmission properties with which the communication apparatus (A) is provided.

According to another aspect of the present invention, in a communication apparatus (A) that performs two-way communication with another communication apparatus (B) by using a single optical fiber, the communication apparatus (A) is provided with: a binarizing portion for binarizing received light according to the intensity of the received light; a detecting portion for detecting repetition, lasting for longer than a predetermined time period, of one of two values in the output of the binarizing portion; and a disconnection recognizing portion for detecting disconnection from the communication apparatus (B) based on the result of the detection by the detecting portion.

According to another aspect of the present invention, in the communication apparatus (A) described above, the predetermined time period is longer than the longest duration for which repetition of an identical code is permitted by the encoding method used by which encoding is achieved during communication.

According to another aspect of the present invention, in a communication apparatus (A) that establishes connection with another communication apparatus (B) through exchange of tone signals, the communication apparatus (A) is provided with a function of detecting, after establishment of connection using a first tone signal, occurrence of a request for data communication within the communication apparatus (A) itself and then transmitting a predetermined second tone signal different from the first tone signal, and a function of detecting reception of a second tone signal from the communication apparatus (B) and thereby recognizing occurrence of a request for data communication within the communication apparatus (B).

According to another aspect of the present invention, in a communication apparatus (A) that establishes connection with another communication apparatus (B) through exchange of tone signals, during a transition from a data-transfer-enabled state for exchanging data signals with the communication apparatus (B) by using one of a plurality of transmission properties to a connection-established state for exchanging tone signals as a result of cancellation of a request for communication occurring within the communication apparatus (A) itself, the communication apparatus (A) determines when to start transmitting a tone signal according to the set of transmission properties it uses.

According to another aspect of the present invention, in a communication apparatus (A) that establishes connection with another communication apparatus (B) through exchange of tone signals, assuming that the fundamental period of the tone signals is T, two or more periods each within the range of from T−α to T+β (where $0 \leq \alpha \leq T$ and $0 \leq \beta \leq T$) are previously set as alternatives of the period with which the communication apparatus (A) transmits tone signals until connection with the communication apparatus (B) is established, and, until connection with the communication apparatus (B) is established, every time the communication apparatus (A) transmits a tone signal, the communication apparatus (A), by choosing one of the two or more periods, sets the period for which it waits before transmitting the next tone signal, and transmits the next tone signal after a lapse of the chosen period.

In the communication apparatuses described above, communication may be performed by the use of optical signals. In communication apparatuses like these, full-duplex communication may be adopted as the communication using optical signals. The communication using optical signals may be single-cable full-duplex communication. It is also possible to handle signals conforming to IEEE1394.

According to another aspect of the present invention, in a communication method in which connection between communication apparatuses is established through exchange of tone signals, whichever communication apparatus transmits a tone signal first during establishment of connection operates with a predetermined set of transmission properties among a plurality of sets of transmission properties after establishment of connection, and a communication apparatus other than the communication apparatus that operates with the predetermined set of transmission properties operates with one of the other sets of transmission properties than the predetermined set of transmission properties after establishment of connection.

According to another aspect of the present invention, in a communication method in which connection between communication apparatuses is established through exchange of tone signals, for each of communication apparatuses that attempt to establish connection, at least two time periods are secured within the time interval after it transmits a tone signal until it transmits the next tone signal. Here, a communication apparatus that receives a tone signal in a predetermined one of the two time periods during establishment of connection operates with a predetermined set of transmission properties among a plurality of sets of transmission properties after establishment of connection, and a communication apparatus other than the communication apparatus that operates with the predetermined set of transmission properties operates with one of the other sets of transmission properties than the predetermined set of transmission properties after establishment of connection.

According to another aspect of the present invention, in a communication method in which communication apparatuses perform two-way communication by using a single optical fiber, the communication apparatuses are each provided with: a binarizing portion for binarizing received light according to the intensity of the received light; and a detecting portion for detecting repetition, lasting for longer than a predetermined time period, of one of two values in the output of the binarizing portion. Here, the communication apparatuses each detect disconnection based on the result of the detection by the detecting portion.

According to another aspect of the present invention, in a communication method in which connection between communication apparatuses is established through exchange of tone signals, a first tone signal is exchanged to request establishment of connection. Moreover, after establishment of connection, a communication apparatus within which a request for data communication has occurred transmits a second tone signal different from the first tone signal so that another communication apparatus that has received the second tone signal recognizes that the request for data communication has occurred within the communication apparatus that has transmitted the second tone signal.

According to another aspect of the present invention, in a communication method in which connection between communication apparatuses is established through exchange of tone signals, when a request for communication occurring within a communication apparatus is cancelled in one of communication apparatuses that are performing data communication by exchanging data signals by using different sets of transmission properties, when to start transmitting a tone signal is determined according to the transmission properties that have been used by the communication apparatus within which the request for communication was cancelled.

According to another aspect of the present invention, in a communication method in which connection between communication apparatuses is established through exchange of tone signals, assuming that the fundamental period of the tone signals is T, for each of communication apparatuses that attempt to establish connection, two or more periods each within the range of from T−α to T+β (where $0 \leq \alpha \leq T$ and $0 \leq \beta \leq T$) are previously set as alternatives of the period with which tone signals are transmitted until connection with another communication apparatus is established, and, until connection with another communication apparatus is established, every time a tone signal is transmitted, one of the two or more periods is chosen as the period for which a wait lasts before transmission of the next tone signal so that the next tone signal is transmitted after a lapse of the chosen period.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Embodiment 1

Now, a first embodiment of the invention will be described with reference to FIGS. 1 and 2.

In this embodiment, when an apparatus (hereinafter the home apparatus) is started up, it goes into a receiving state without transmitting a tone. If the home apparatus receives a tone from another apparatus (hereinafter the partner apparatus) before a lapse of a period T, it is determined to act as a parent apparatus, and immediately transmits a tone to establish connection. If the home apparatus does not receive a tone from the partner apparatus after a lapse of a period T, it repeats transmitting a tone at time intervals t shorter than T until it receives a tone from the partner apparatus, and then the home apparatus is determined to act as a child apparatus and establishes connection.

Tone Exchange Timing

Figure 1:
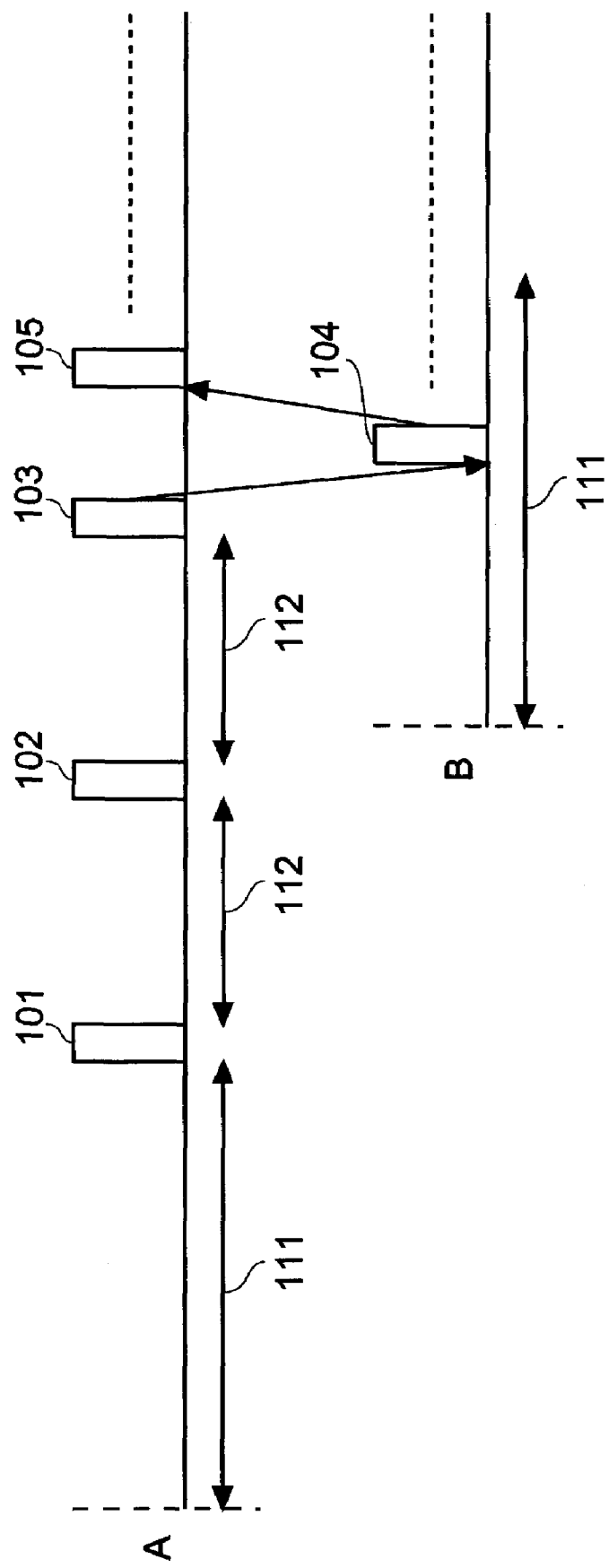
FIG. 1 is a diagram showing the timing with which tone signals are exchanged to establish connection in a first embodiment of the invention.

FIG. 1 is a diagram showing the timing with which the two apparatuses transmit tone signals to establish connection by this method. Here, the apparatus that is started up first is called the apparatus A, and the apparatus that is started up later is called the apparatus B.

In this figure, reference numerals 101, 102, 103, and 105 represent tones transmitted by the apparatus A, and reference numeral 104 represents the tone transmitted by the apparatus B. Reference numeral 111 represents the longest duration T for which the system of each apparatus, after start-up, waits for a tone from the partner apparatus. Reference numeral 112 represents the interval t after a second or later tone is transmitted until the next tone is transmitted.

After start-up, the apparatus A waits for the period T but does not receive a tone from the partner apparatus, and therefore transmits a tone 101. Thereafter, the apparatus A further waits for the period t but does not receive a tone from the partner apparatus, and therefore transmits a tone 102. Thereafter, if the apparatus A further waits for the period t and still does not receive a tone from the partner apparatus, it repeats transmitting a tone 103.

When the apparatus B is started up, the partner apparatus A has already been started up and is repeating the transmission of a tone at intervals t. Thus, within the period T, the apparatus B receives the tone 103. On receiving the tone 103, the apparatus B is determined to act as a parent apparatus, and transmits a tone 104 to the partner apparatus to establish connection.

On receiving the tone 104 from the partner apparatus B started up later, the apparatus A is determined to act as a child apparatus, and establishes connection.

Procedure Flow Chart

Figure 2:
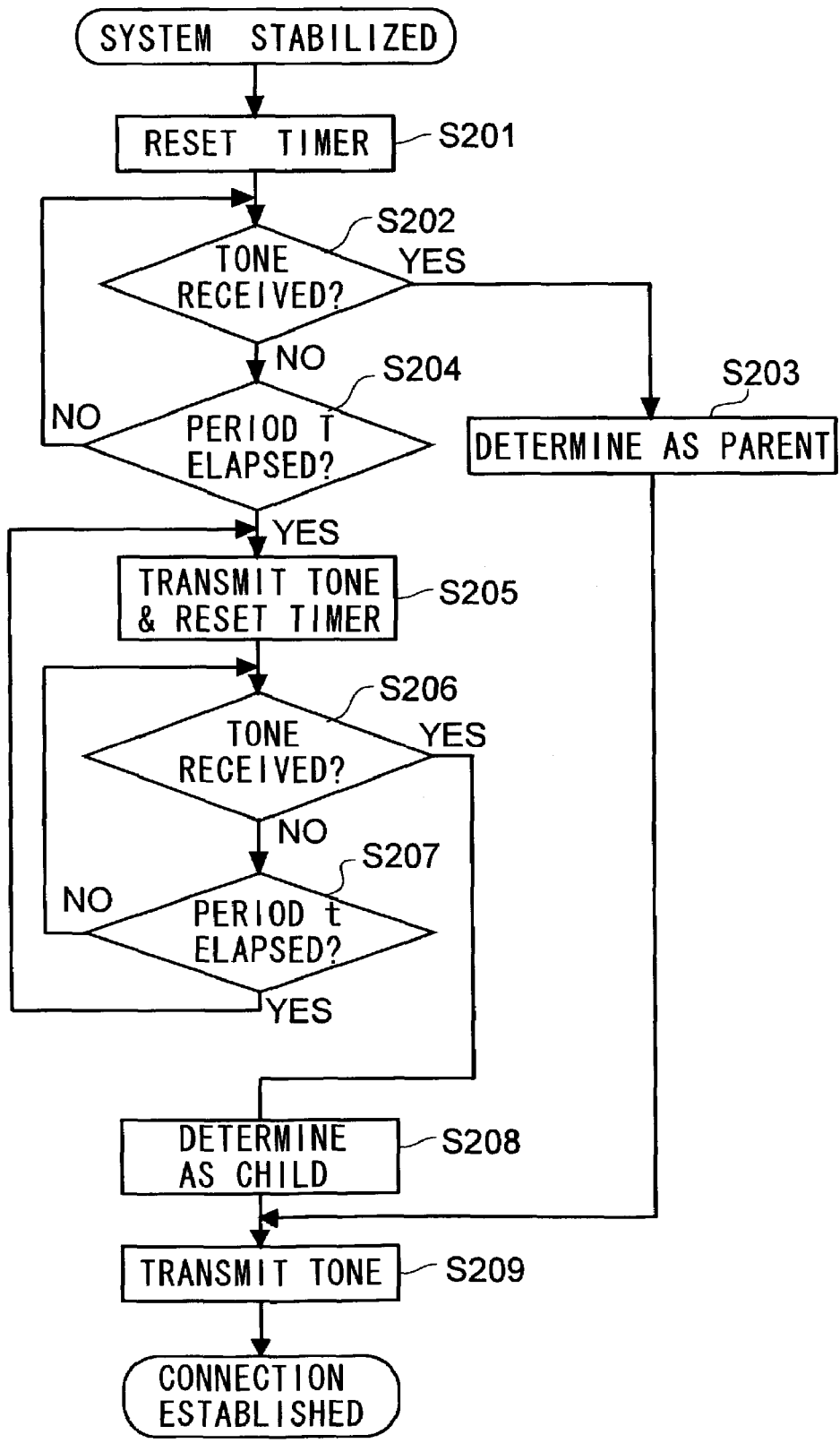
FIG. 2 is a flow chart of the procedure executed by an apparatus to establish connection in the first embodiment of the invention.

FIG. 2 is a flow chart of the procedure executed in a communication apparatus provided with the function of establishing connection by the method described in this embodiment.

In step S201, a timer for counting the length of a wait for reception is reset. When the timer is reset, the procedure proceeds to step S202. In step S202, whether a tone from the partner apparatus is received or not is checked. If a tone from the partner apparatus is received, the procedure proceeds to step S203, and otherwise the procedure proceeds to step S204.

In step S203, the operation that is to be performed when the home apparatus receives a tone from the partner apparatus before the home apparatus itself transmits a tone is performed. Specifically, the home apparatus is determined to act as a parent apparatus, and the procedure then proceeds to step S209.

In step S204, whether the value of the timer has reached T or not is checked. If the value of the timer has exceeded T, the procedure proceeds to step S205, and otherwise the procedure returns to step S202.

In step S205, a tone is transmitted, and the timer is reset. When these operations are complete, the procedure proceeds to S206. In step S206, whether a tone from the partner apparatus is received or not is checked. If a tone from the partner apparatus is received, the procedure proceeds to step S208, and otherwise the procedure proceeds to step S207.

In step S207, whether the value of the timer has reached t or not is checked. If the value of the timer has exceeded t, the procedure proceeds to step S205, and otherwise the procedure returns to step S206.

In step S208, the operation that is to be performed when the home apparatus receives a tone from the partner apparatus after the home apparatus itself has transmitted a tone is performed. Specifically, the home apparatus is determined to act as a child apparatus, and the procedure then proceeds to step S209. In step S209, a tone is transmitted to establish connection. With the transmission of this tone, connection is established.

In this way, it is possible to establish connection and simultaneously determine a parent-child relationship. On the basis of the parent-child relationship determined here, the two apparatuses each decide which to use of the two sets of transmission properties with which they are provided. For example, assuming that the parent apparatus uses a wavelength A and the child apparatus uses a wavelength B, even in the presence of stray light, the light from the two apparatuses can be separated on the basis of the difference in wavelength. This makes it possible to accurately detect disconnection.

Embodiment 2

However, in the first embodiment, if one of two apparatuses that are connected transmits a first tone at almost the same time as the other transmits a tone, it is occasionally impossible to determine a parent-child relationship. Therefore, in a second embodiment of the invention described below, a method for determining a parent-child relationship without fail will be described.

Now, a second embodiment of the invention will be described with reference to FIGS. 3, 4, 5, and 6.

In this embodiment, apparatuses, after start-up, each repeat transmitting a tone at predetermined intervals, and, if the home apparatus receives a tone transmitted from the partner apparatus while the home apparatus is not transmitting, communication is established.

The period in which the home apparatus is not transmitting a tone is divided into three time regions, namely a parent region, a child region, and a dead region. Whether the home apparatus is to act as a parent or child apparatus is determined according to in which time region it receives a tone from the partner apparatus. Specifically, if the home apparatus receives a tone from the partner apparatus within the parent region, the home apparatus is determined to act as a parent apparatus; if the home apparatus receives a tone from the partner apparatus within the child region, the home apparatus is determined to act as a child apparatus. In the dead region, no reception of a tone takes place.

Parent Region and Child Region

Figure 3:
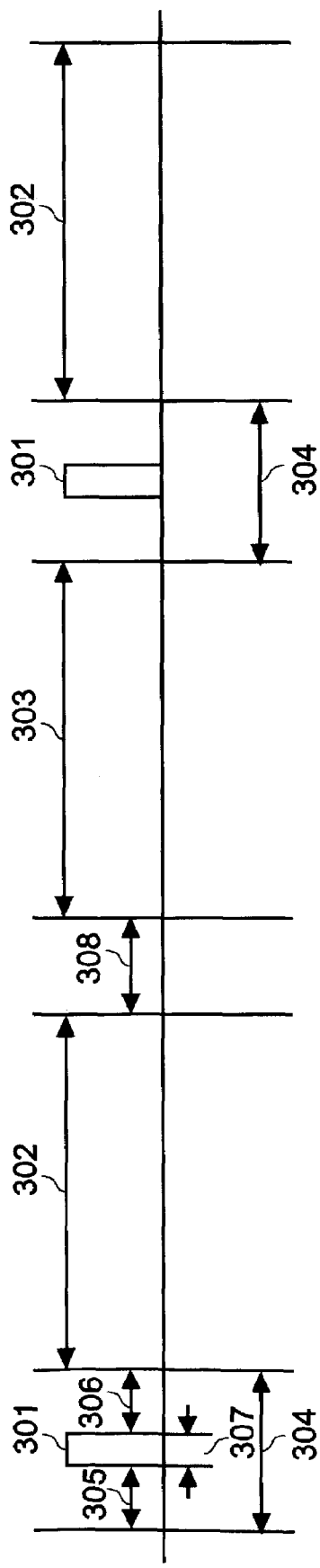
FIG. 3 is a diagram illustrating the time regions secured in a second embodiment of the invention.

FIG. 3 is a diagram showing the parent, child, and dead regions. The parent, child, and dead regions are defined on a relative time scale with respect to the time point at which the home apparatus transmits a tone.

Reference numeral 301 represents tones transmitted by the home apparatus. The periods between those tones 301 are divided into parent regions 302 and child regions 303, and between those time regions 302 and 303 are secured dead regions 304 and 308.

If the home apparatus receives a tone from a partner apparatus in one of the parent regions 302, the home apparatus is determined to act as a parent apparatus. If the home apparatus receives a tone from a partner apparatus in one of the child regions 303, the home apparatus is determined to act as a child apparatus. It is preferable that the length of the child regions 303 be equal to or longer than that of the parent regions 302.

The dead regions 304 each include a period immediately before, a period during, and a period immediately after the transmission of a tone. Reference numeral 305 represents the portion of a dead region immediately before tone transmission, and its length equals (tone width)+(transfer delay)+(margin). Reference numeral 306 represents the portion of a dead region immediately after tone transmission, and its length equals the length of the portion immediately before tone transmission. Reference numeral 307 represents the width of a tone.

The dead regions 308 are secured between every parent region and the following child region. The dead regions 308 each need to be at least so long as to guarantee that a tone will not be received continuously over a parent region and the following child region.

When Home Apparatus Acts as Parent

Figure 4:
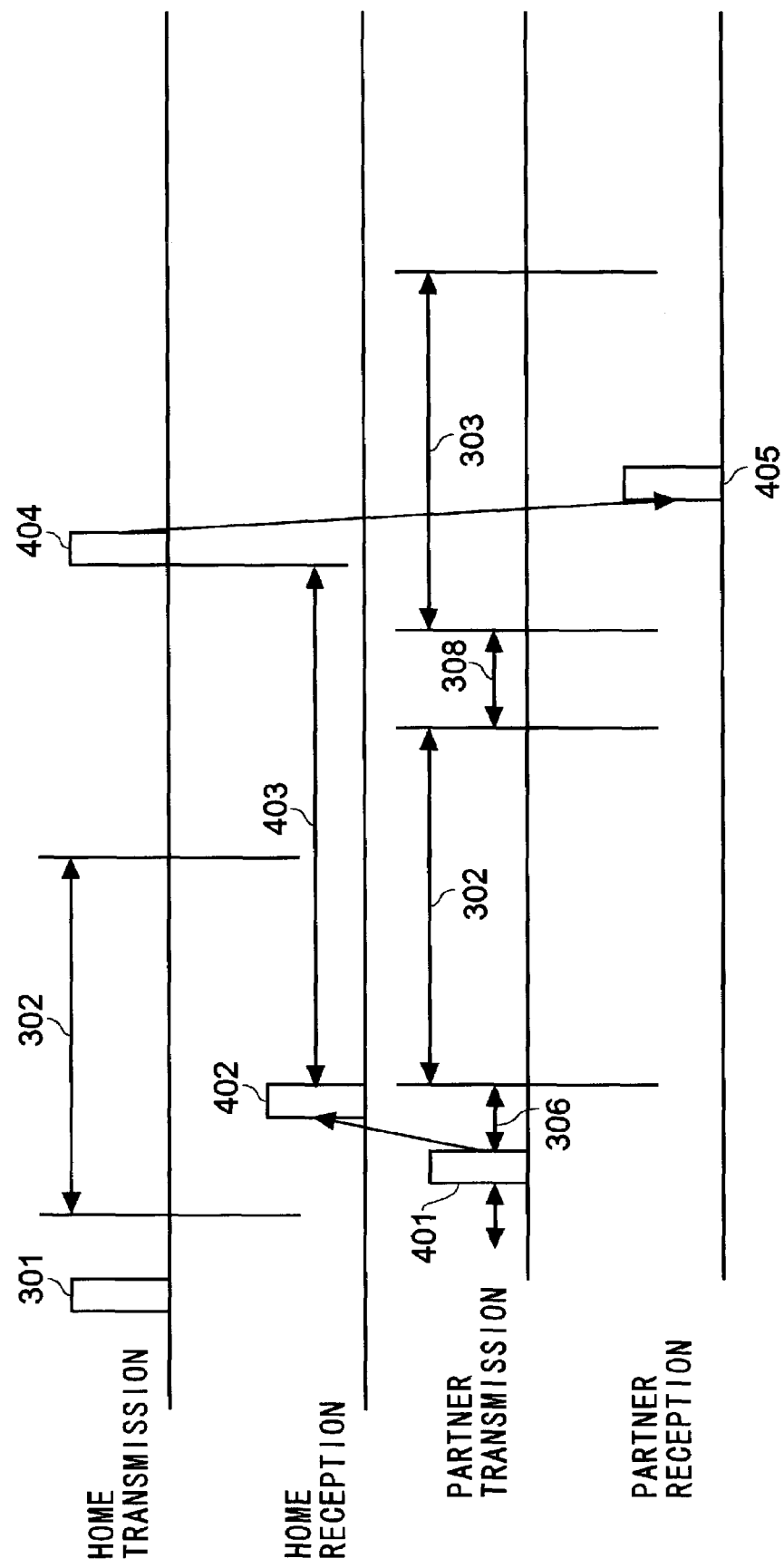
FIG. 4 is a diagram showing the timing with which tone signals are exchanged to establish connection when an apparatus is determined to act as a parent apparatus in the second embodiment of the invention.

Now, the operation of the home apparatus when it acts as a parent apparatus will be described with reference to FIG. 4.

Reference numeral 401 represents a tone transmitted by the partner apparatus. Reference numeral 402 represents a received tone, that is, the partner tone 401 as received by the home apparatus. The received tone 402 is received within a parent region 302, and therefore the home apparatus is determined to act as a parent apparatus. In this case, the partner apparatus needs to be determined to act as a child apparatus, and therefore, in the next step, the home apparatus needs to transmit a tone 404 with such timing that the partner apparatus receives the tone of the home apparatus in a child region of the partner apparatus.

Thus, the home apparatus, after receiving the received tone 402, first waits for a predetermined period 403 and then transmits a tone 404. For the partner apparatus to receive a tone of the home apparatus in a child region of the partner apparatus, the length 403 of the wait is made equal to, for example, the sum of the length 306 of the portion of a dead region after transmission, the length 302 of a parent region, and the length 308 of a dead region between a parent and a child region. This permits the tone 404 transmitted by the home apparatus to be received, as a received tone 405, by the partner apparatus in a child region 303 of the partner apparatus. Thus, the partner apparatus is determined to act as a child apparatus.

When Home Apparatus Acts as Child

Figure 5:
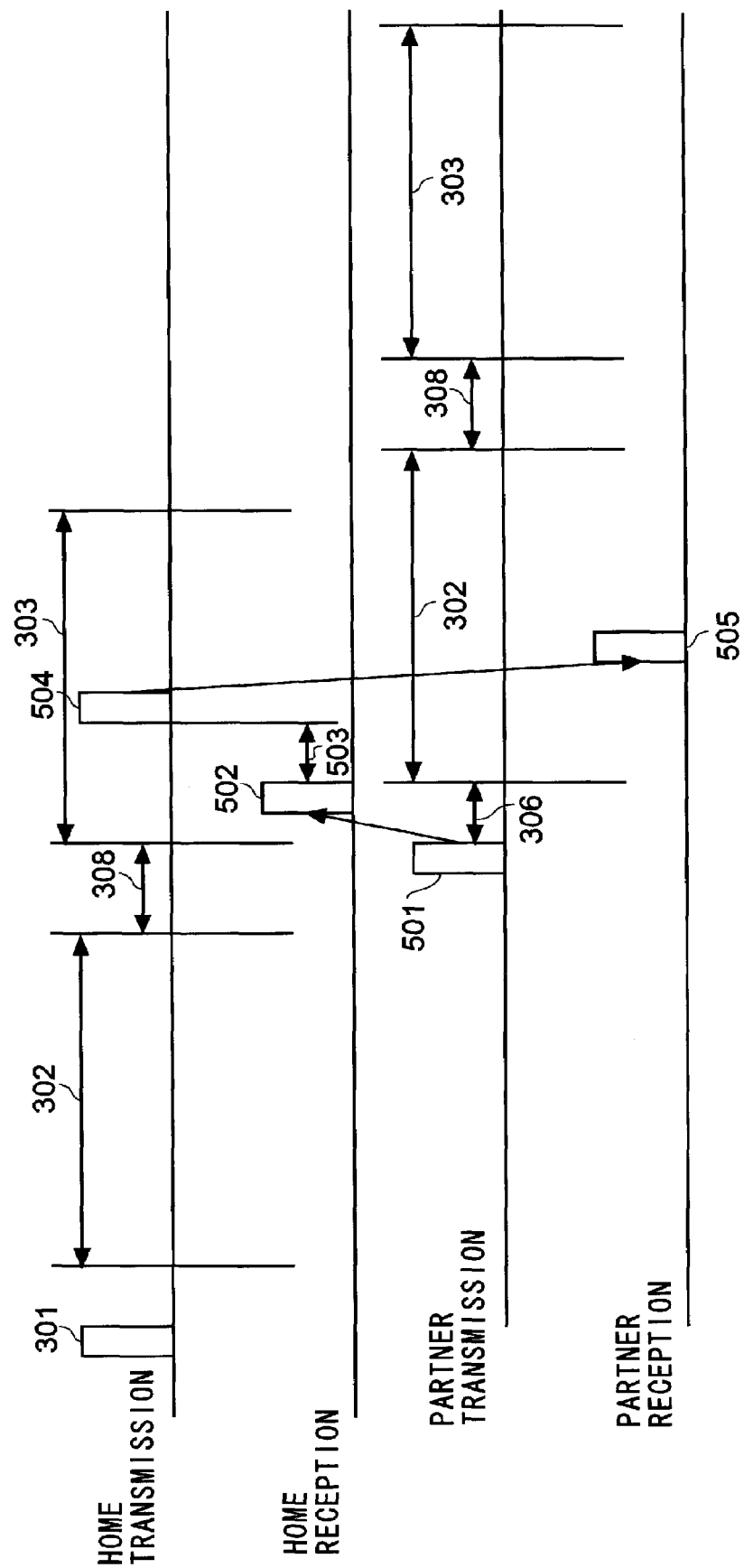
FIG. 5 is a diagram showing the timing with which tone signals are exchanged to establish connection when an apparatus is determined to act as a child apparatus in the second embodiment of the invention.

Next, the operation of the home apparatus when it acts as a child apparatus will be described with reference to FIG. 5.

Reference numeral 501 represents a tone transmitted by the partner apparatus. Reference numeral 502 represents a received tone, that is, the partner tone 501 as received by the home apparatus. The received tone 502 is detected within a child region 303, and therefore the home apparatus is determined to act as a child apparatus. In this case, the partner apparatus needs to be determined to act as a parent apparatus, and therefore, in the next step, the home apparatus needs to transmit a tone 504 with such timing that the partner apparatus receives the tone of the home apparatus in a parent region of the partner apparatus. The transmission of a tone by the partner apparatus is immediately followed, with a dead region 306 secured in between, by a child region 303 of the partner apparatus. Thus, the home apparatus, after receiving the tone 502, first waits for a period 503 as long as a dead region 306, and then transmits the tone 504.

This permits the tone 504 transmitted by the home apparatus to be received, as a received tone 505, by the partner apparatus in a parent region 302 of the partner apparatus. Thus, the partner apparatus is determined to act as a parent apparatus.

Procedure Flow Chart

Figure 6:
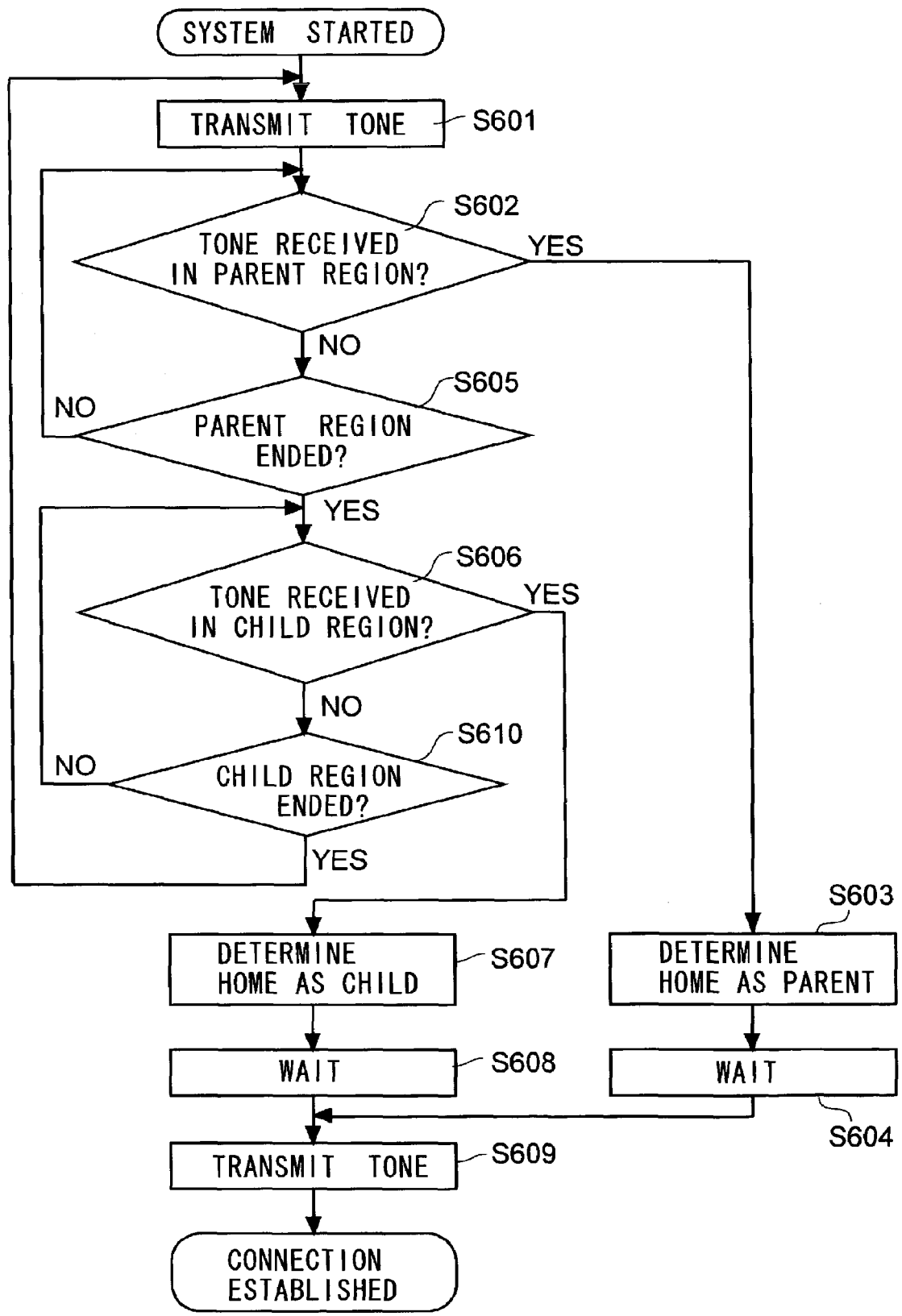
FIG. 6 is a flow chart of the procedure executed by an apparatus to establish connection in the second embodiment of the invention.

FIG. 6 is a flow chart of the procedure executed in a communication apparatus provided with the function of establishing connection by the method described in this embodiment.

In step S601, the home apparatus transmits a tone. After the tone is transmitted, a timer for checking the end of a time region is reset, and the procedure proceeds to step S602.

In step S602, a tone from the partner apparatus is received. If a tone is received, the procedure proceeds to step S603, and otherwise the procedure proceeds to step S605.

In step S603, the home apparatus is determined to act as a parent apparatus. When the home apparatus is determined to act as a parent apparatus, the procedure proceeds to step S604.

In step S604, the home apparatus waits for a predetermined period so that the tone that is going to be transmitted will be received by the partner apparatus in a child region thereof. The length of the wait here equals, for example, the sum of the length 306 of the portion of a dead region after tone transmission, the length 302 of a parent region, and the length 308 of a dead region, all shown in FIG. 3. This guarantees that the tone that is going to be transmitted in the next step S609 will be received by the partner apparatus within a child region thereof. When the wait ends, the procedure proceeds to step S609.

In step S605, whether a parent region has ended or not is checked. If the value of the timer indicates that a parent region has ended, the timer is reset, and the procedure then proceeds to step S606; if a parent region is still lasting, the procedure returns to step S602.

In step S606, a tone from the partner apparatus is received. When a tone is received, the procedure proceeds to step S607, and otherwise the procedure proceeds to step S610.

In step S607, the home apparatus is determined to act as a child apparatus. When the home apparatus is determined to act as a child apparatus, the procedure proceeds to step S608.

In step 608, the home apparatus waits for a predetermined period so that the tone that is going to be transmitted will be received by the partner apparatus in a parent region thereof. The length of the wait here equals, for example, the length 306 of a dead region after tone transmission shown in FIG. 3. This guarantees that the tone that is going to be transmitted in the next step S609 will be received by the partner apparatus within a parent region thereof. When the wait ends, the procedure proceeds to step S609.

In step S609, the home apparatus transmits a tone. On completion of the transmission of the tone, connection is established.

In step S610, whether a child region has ended or not is checked. If the value of the timer indicates that a child region has ended, the timer is reset, and the procedure then returns to step S601; if a child region is still lasting, the procedure returns to step S606.

In this way, it is possible to establish connection and simultaneously determine a local parent-child relationship. On the basis of the parent-child relationship determined here, the two apparatuses each decide which to use of the two sets of transmission properties with which they are provided. For example, assuming that the parent apparatus uses a wavelength A and the child apparatus uses a wavelength B, even in the presence of stray light, the light from the two apparatuses can be separated on the basis of the difference in wavelength. This makes it possible to accurately detect disconnection.

Embodiment 3

Now, a third embodiment of the invention will be described with reference to FIGS. 7 and 8.

In this embodiment, disconnection is detected by exploiting the characteristics of a receiving amplifier, i.e., the amplifier on the receiving side. This eliminates the need to determine a parent-child relationship.

Figure 7:
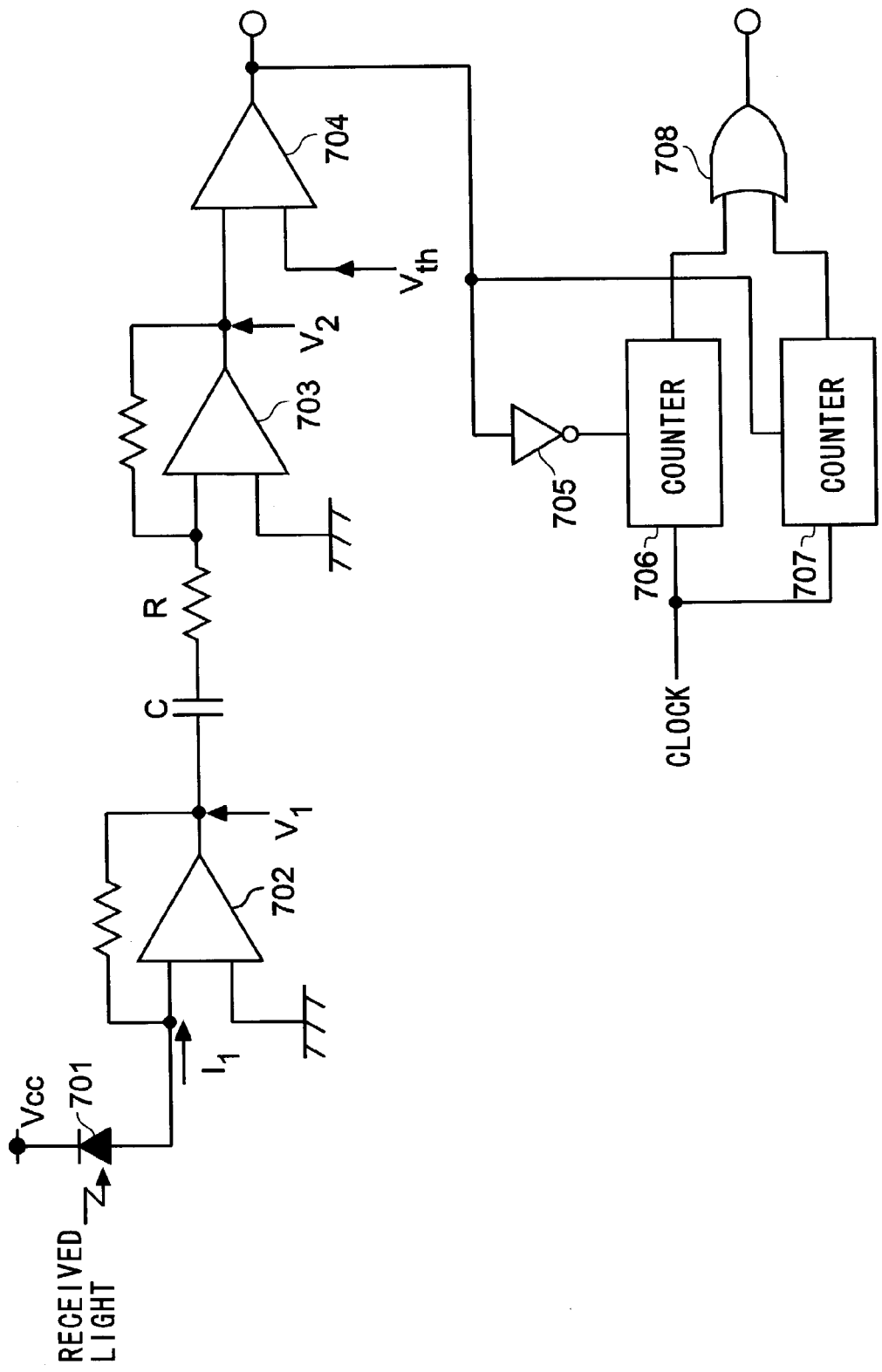
FIG. 7 is a diagram showing the configuration of the receiving amplifier for amplifying the received signal in a third embodiment of the invention.

FIG. 7 is a diagram showing the configuration of a receiver amplifier. Reference numeral 701 represents a photodiode for receiving light over an optical fiber. Reference numerals 702 and 703 represent OP (operational) amplifiers for amplifying signals. Reference numeral 704 represents a comparator.

Reference numerals 706 and 707 represent counters for counting time lengths. As a reset signal, the counter 706 receives the inverted level of the output of the comparator 704, and the counter 707 receives the output of the comparator 704. Thus, when the output of the comparator 704 remains high for longer than a predetermined period, the counter 706 outputs a high level; when the output of the comparator 704 remains low for longer than a predetermined period, the counter 707 outputs a high level. The OR gate 708 outputs the OR of the outputs of the counters 706 and 707. That is, when the same code persists for longer than a predetermined period in the output of the comparator 704, the OR gate 708 outputs a high level.

Figure 8:
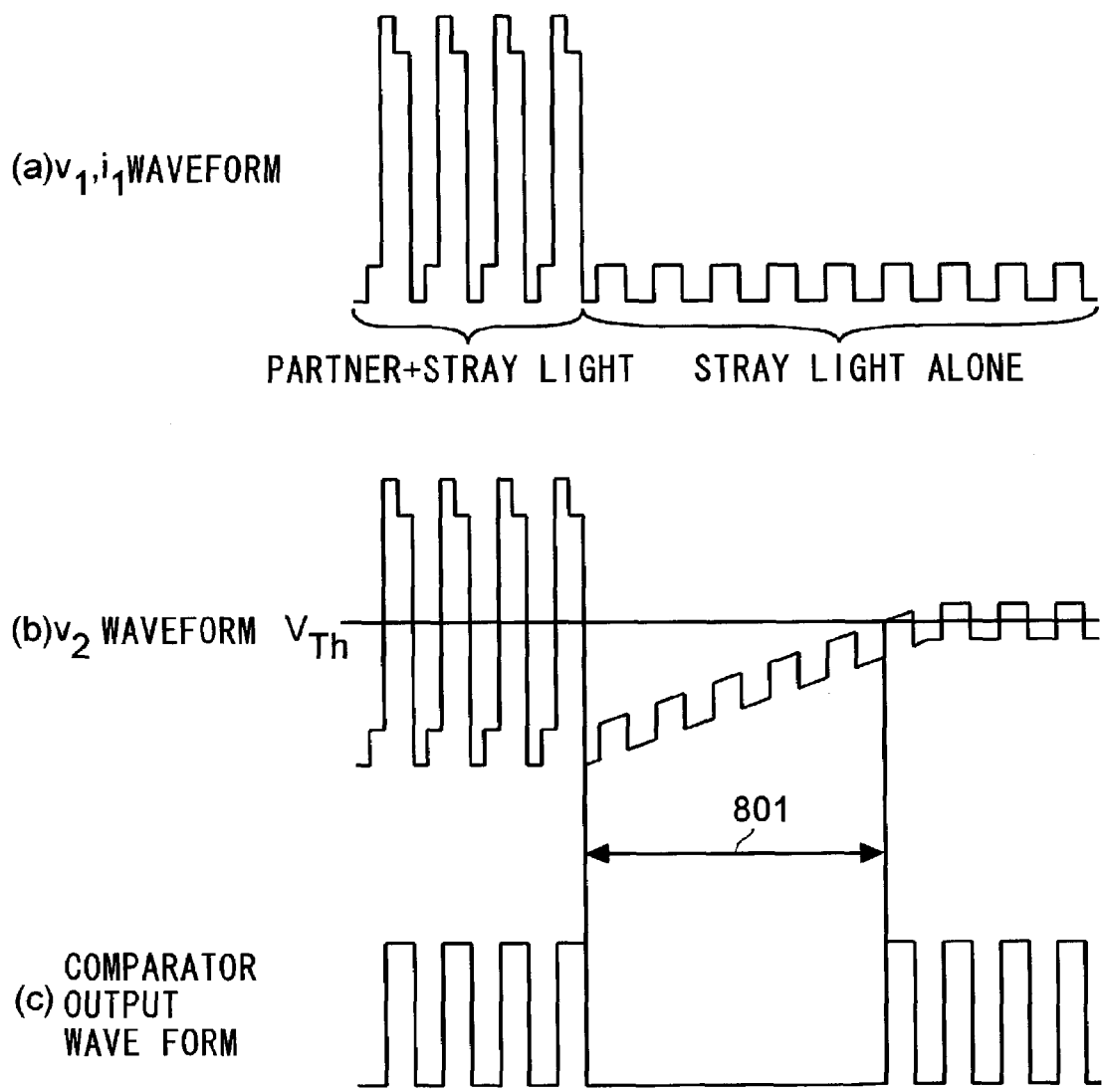
FIG. 8 is a diagram showing the waveforms of the signals observed at relevant points in the receiving amplifier in the third embodiment of the invention.

In FIG. 8, at (a) is shown the waveform of the output current V1 of the photodiode 701 and the output of the OP amplifier 702. In the earlier portion of this waveform, the partner apparatus is emitting light, and therefore the signal obtained is a mixture of the partner light and the stray light. In the latter portion of the waveform, the partner apparatus stops emitting light, and only the tray light is observed.

In FIG. 8, at (b) is shown the output of the OP amplifier 703. After the partner apparatus stops emitting light, the direct-current component varies, and accordingly the voltage level representing the stray light component gradually approaches a threshold level. Here, it takes a certain length of time 801 for the stray light component to exceed the threshold level.

In FIG. 8, at (c) is shown the output of the comparator 704. During the period 801 after disconnection (the ceasing of light emission by the partner apparatus) until the stray light component exceeds the threshold level, the same code (in this case, "0") persists. This period corresponds to a few tens of bits, which well exceeds the maximum run length in 8B10B encoding. Accordingly, by detecting repetition of the same code in more than a predetermined number of consecutive bits by the use of the circuits 705, 706, 707, and 708, it is possible to detect disconnection.

Embodiment 4

Now, a fourth embodiment of the invention will be described with reference to FIGS. 9 and 10.

This embodiment deals with a practical means for recognizing the start of mutual data communication on the basis of an SD signal that is prone to become active when the home apparatus itself transmits.

Figure 9:
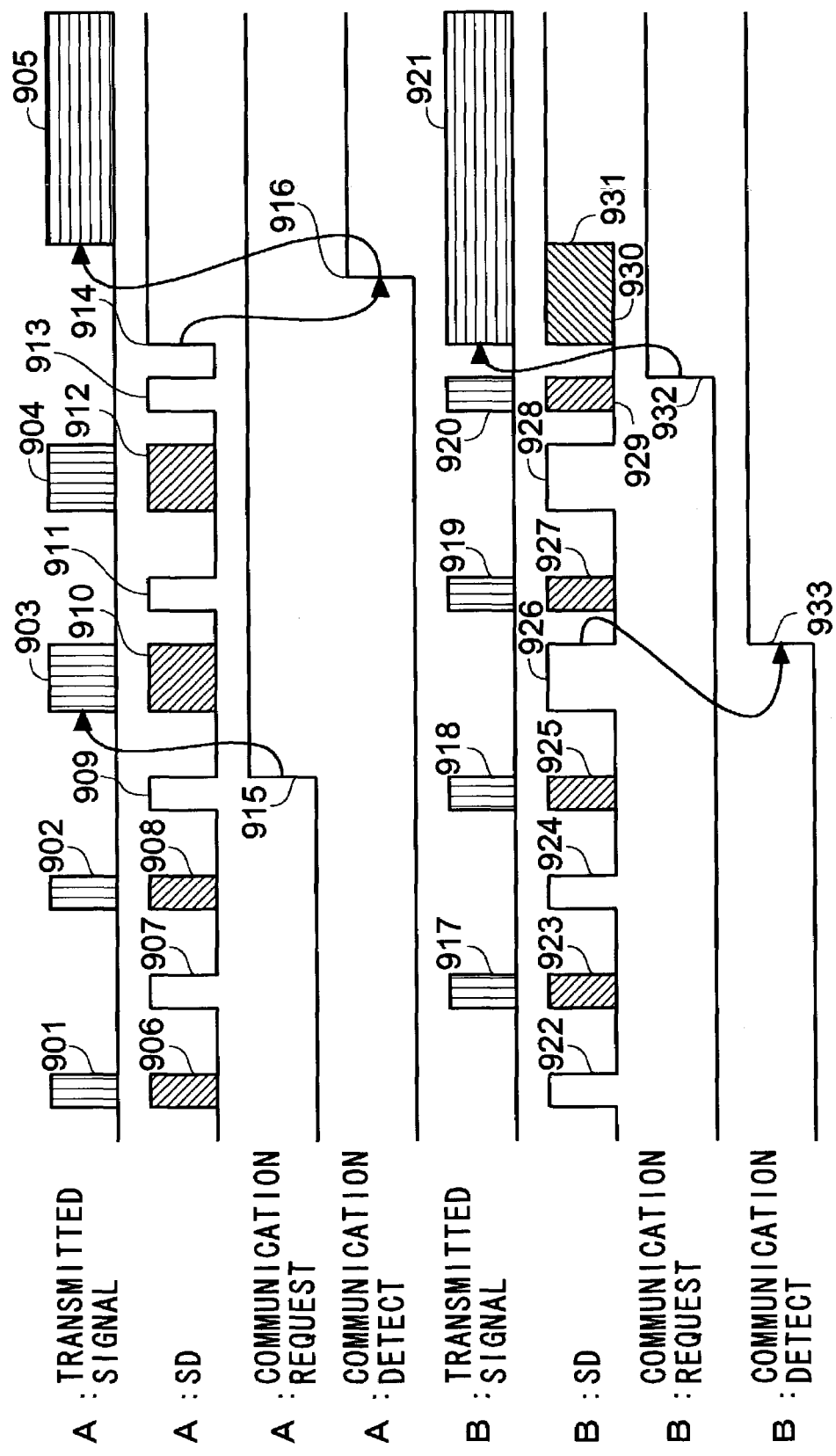
FIG. 9 is a diagram showing the waveforms of relevant signals to illustrate the principle of operation in a fourth embodiment of the invention.

FIG. 9 is a timing chart showing the principle of operation. In FIG. 9, the establishment of connection has already been detected through exchange of tones. Even after the detection, the same tones are exchanged until data communication is started. Reference numerals 901, 902, 917, 918, 919, and 920 are tone signals.

Thereafter, the apparatus A produces a data communication request signal 915 within itself When this signal becomes active, the apparatus A transmits tone signals 903 and 904 different from those used for the establishment of connection. In this embodiment, used as the different tone signals are tone signals three times as long as the tone signals for the establishment of connection.

The two apparatuses both ignore the SD signal for periods corresponding to a predetermined margin added to each of the periods 906, 908, 910, 912, 923, 925, 927, and 929 in which the home apparatus is transmitting a tone, and detect whether the SD signal is active or not in the other periods so as to detect the presence of a signal from the partner apparatus. Thus, the apparatus B detects the tone signal 926 that is transmitted when a request for data communication occurs in the partner apparatus, and then makes a communication detect signal active (933).

Next, when a data communication request signal 932 is produced within the apparatus B, the apparatus B, in which the communication detect signal is already active, starts transmitting a data communication signal 921. While the apparatus A is transmitting tone signals 903 and 904 in the presence of a data communication request signal, its transmission is intermittent. Thus, when the home apparatus is not transmitting, it can detect the presence of a signal transmitted from the partner apparatus on the basis of the SD signal. Thus, when, in response to the signal 921 transmitted from the apparatus B, the SD signal of the apparatus A remains active (914) for a period longer than the tone signals 901 and 902 by more than a predetermined period, the apparatus A recognizes the partner apparatus B as having started data communication, and itself starts data communication.

In this way, even on the basis of an SD signal that is prone to become active under the influence of stray light when the home apparatus transmits, both apparatuses can recognize the start of data communication by the partner apparatus.

Figure 10:
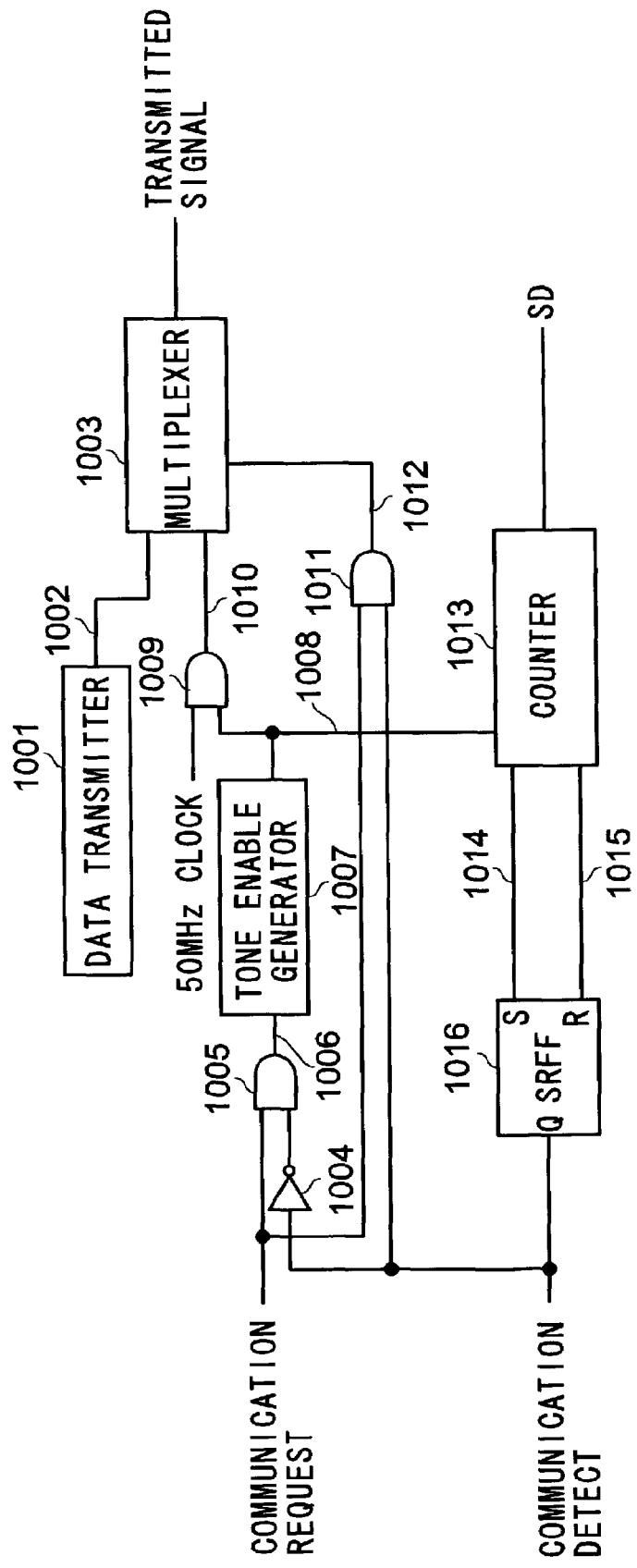
FIG. 10 is a circuit diagram in the fourth embodiment of the invention.

FIG. 10 is a diagram showing the configuration of a circuit that realizes the procedure described above.

A data transmitter 1001 produces a data transmission signal 1002. An AND gate 1005 receives a communication request signal produced within an apparatus and a signal obtained by inverting a communication detect signal produced within the apparatus.

A tone enable generator 1007 receives the output signal 1006 of the AND gate 1005. When the signal 1006 is low, the tone enable generator 1007 produces a tone enable signal for generating a tone signal for establishment of connection, and outputs the tone enable signal to the signal 1008. On the other hand, when the signal 1006 is high, the tone enable generator 1007 produces a tone enable signal for generating a tone signal indicating a request for data communication, and outputs the tone enable signal to the signal 1008. This embodiment deals with an example in which the tone signal indicating a request for data communication is a pulse signal three times as long as the tone signal for establishment of connection.

An AND gate 1009 receives, for example, a periodic signal of 50 MHz and the signal 1008. The output signal 1010 of the AND gate 1009 is a tone signal. An AND gate 1011 receives the communication request signal and the communication detect signal.

A multiplexer 1003 receives the data transmission signal 1002, the tone signal 1010, and the output signal 1012 of the AND gate 1011. When the signal 1012 is low, i.e., when either the communication request signal or the communication detect signal is low, the multiplexer 1003 outputs the same waveform as the tone signal 1010. When the signal 1012 is high, i.e., when both the communication request signal and the communication detect signal are high, the multiplexer 1003 outputs the same waveform as the data transmission signal 1002.

In this configuration, when the communication request signal is low, an apparatus transmits a tone signal for establishment of connection; when the communication request signal is high and the communication detect signal is low, an apparatus transmits a tone signal indicating a request for communication; when the communication request signal is high and the communication detect signal is high, an apparatus outputs a data signal.

A counter 1013 receives the SD signal and the tone enable signal 1008. The counter 1013 turns a signal 1014 high when the tone enable signal 1008 is low and in addition the SD signal remains active for a period longer than a tone signal for establishment of connection. On the other hand, the counter 1013 turns a signal 1015 high when the tone enable signal 1008 is low and in addition when the signal 1014 does not remain active for a period longer than the period of the tone.

A set/reset flip-flop 1016 receives the signal 1014 and the signal 1015. When an apparatus detects a tone indicating a request for communication occurring in the partner apparatus, the signal 1014 turns high, and therefore the set/reset flip-flop 1016 outputs a high level. When no tone indicating a request for communication occurring in the partner apparatus is detected for a period longer than the period of the tone, the set/reset flip-flop 1016 outputs a low level.

In this way, the set/reset flip-flop 1016 produces a signal corresponding to the communication detect signal shown in FIG. 9.

When the configuration of this embodiment is adapted for IEEE1394 the communication request signal corresponds to the TpBias generation signal, and the communication detect signal corresponds to the bias_detect signal. This correspondence makes possible not only implementation of the function of detecting the start of data communication, but also implementation of the suspend/resume function supported by the IEEE1394a, which is a revised version of IEEE1394.

Embodiment 5

Now, a fifth embodiment of the invention will be described with reference to FIGS. 11, 12, and 13.

According to the method of this embodiment, even after the establishment of connection, two apparatuses both act as child apparatuses, and their parent-child relationship is determined on the occasion of a transition to a data-transfer-enabled state.

Figure 11:
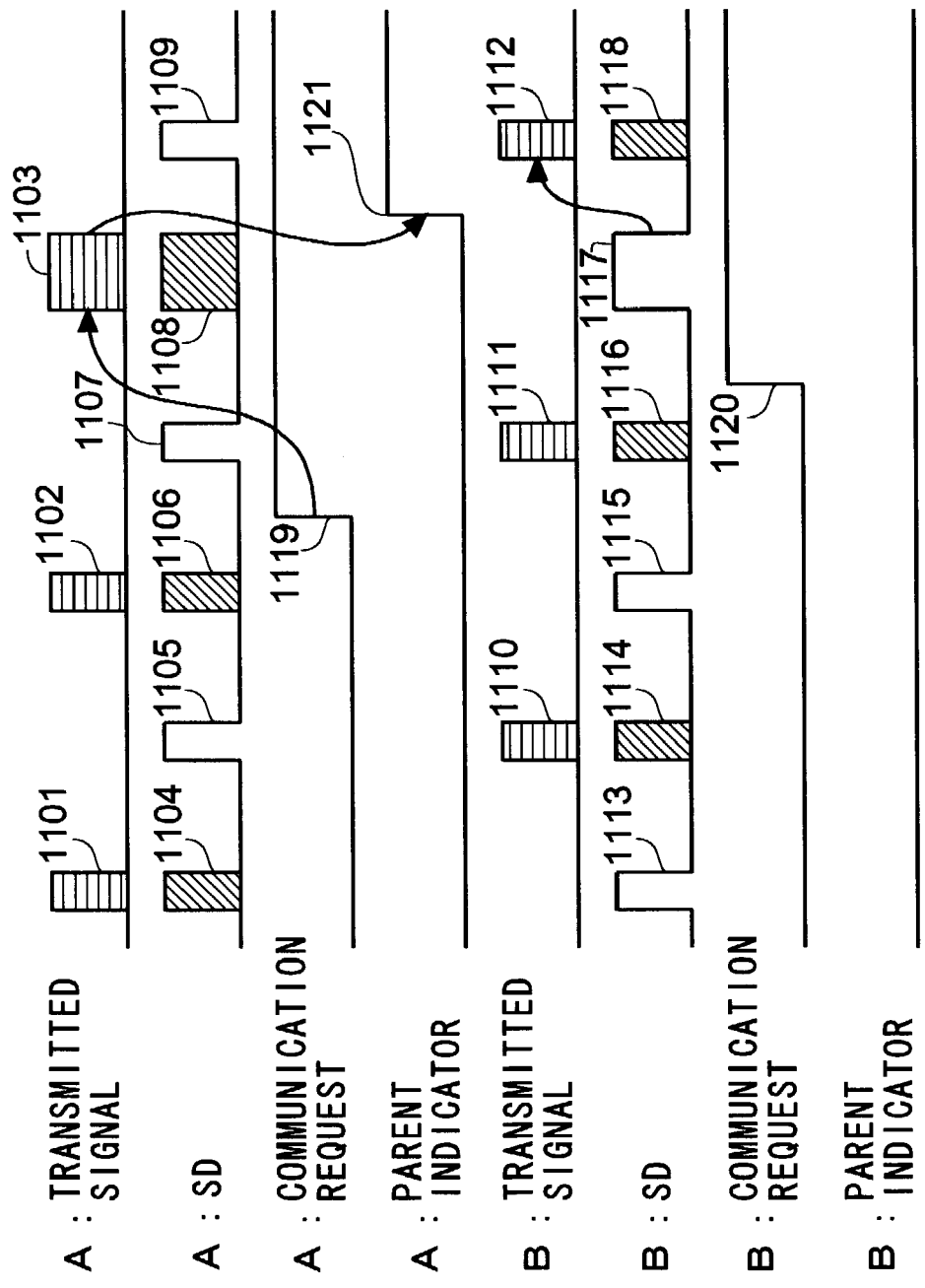
FIG. 11 is a diagram showing the waveforms of relevant signals to illustrate the principle of operation in a fifth embodiment of the invention.

FIG. 11 is a timing chart showing the principle of operation. In FIG. 11, as in the fourth embodiment (FIG. 9), the establishment of connection has already been detected through exchange of tone signals. In the following descriptions, the apparatus in which a request for data communication occurs first is called the apparatus A, and the apparatus in which a request for data communication occurs later is called the apparatus B.

After the apparatuses A and B both have gone into a connection-established state, the establishment of connection is detected through exchange of tone signals. At this time, as distinct from embodiments 1 and 2, no parent-child relationship is determined between the apparatuses A and B, and thus the two apparatuses both act as child apparatuses. Specifically, as shown in FIG. 11, the apparatus A transmits short tone signals 1101 and 1102, and the apparatus B transmits short tone signals 1110 and 1111. In this way, the apparatuses A and B, after detecting the establishment of connection with each other until starting data communication, both act as child apparatuses and continue exchanging short tone signals. Thus, meanwhile, a parent indicator signal that indicates the parent-child relationship between the apparatuses A and B remains low.

Thereafter, first, the apparatus A produces a data communication request signal 1119 within itself Moreover, the apparatuses A and B ignore the SD signal in periods corresponding to a predetermined margin added to each of the periods 1104, 1106, 1108, 1114, 1116, and 1118 in which the home apparatus is transmitting a signal, and checks whether the SD signal is active or not in the other periods so as to detect the presence of a tone signal from the partner apparatus. Thus, the apparatus A detects, on the basis of the SD signal 1105, the short tone signal 1110 from the apparatus B, and the apparatus B detects, on the basis of the SD signals 1113 and 1115, the short tone signals 1101 and 1102 from the apparatus A.

Accordingly, when the data communication request signal becomes active, the apparatus A, after the occurrence of a request for data communication, detects the SD signal 1107 and thereby recognizes the short tone signal 1111 transmitted from the apparatus B. After recognizing this short tone signal 1111, the apparatus A transmits a tone signal 1103 different from and longer than the short tone for establishment of connection. In this embodiment, used as the long tone signal is a tone signal three times as long as the short tone signal.

After transmitting the long tone signal 1103 in this way, the apparatus A, with the parent indicator signal 1121 turned high, is determined to act as a parent apparatus. On the other hand, the apparatus B, even when a data communication request signal 1120 occurs therein, detects the long tone signal 1103 on the basis of the SD signal 1117 before transmitting a short tone signal 1112. Thus, the apparatus B recognizes the apparatus A as having gone into a data-transfer-enabled state and been determined to act as a parent apparatus. With the parent indicator signal remaining low, the apparatus B is determined to act as a child apparatus.

In this way, by changing the type of tone signal transmitted on the occasion of a transition to a data-transfer-enabled state, it is possible to determine the parent-child relationship between two communication apparatuses.

Figure 12:
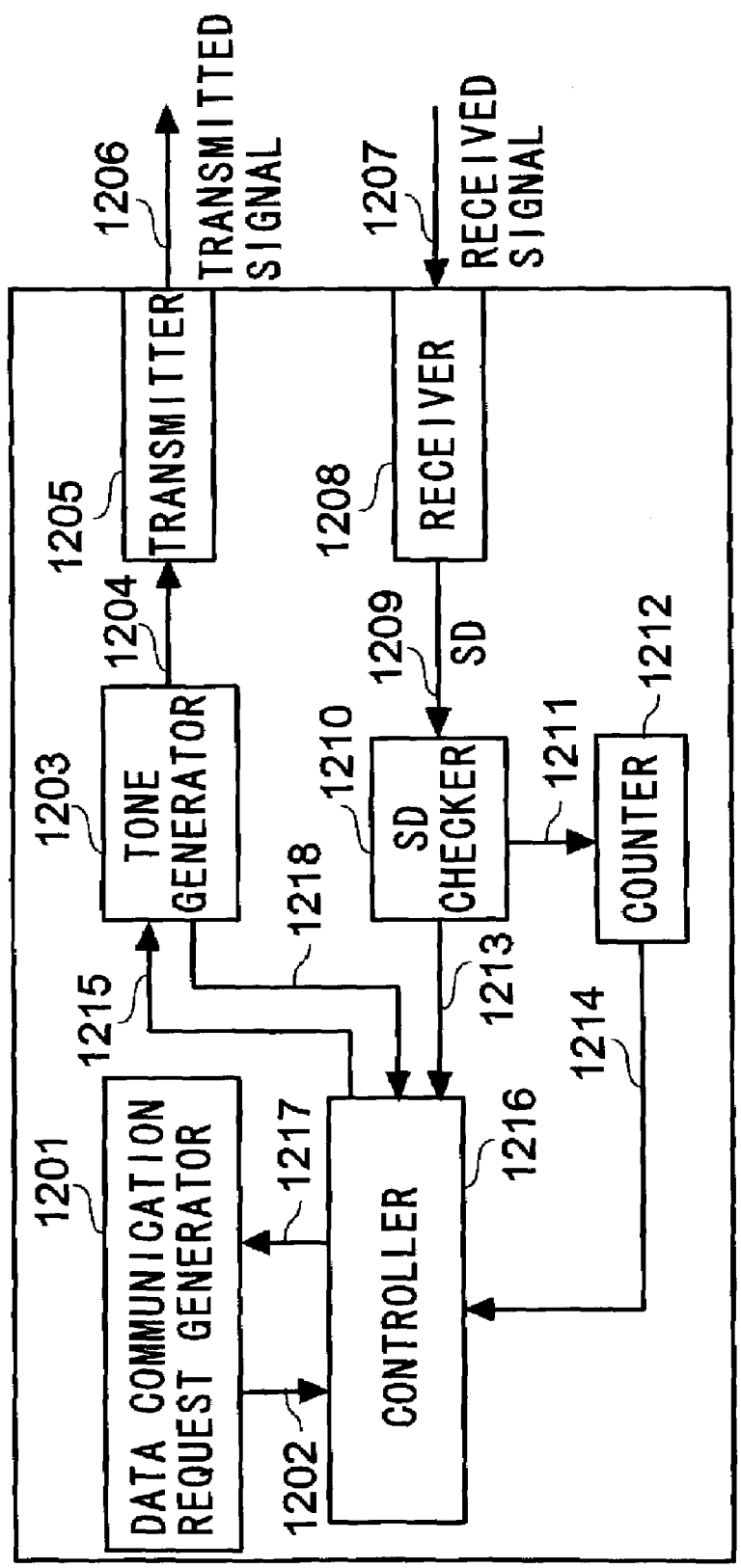
FIG. 12 is a block diagram in the fifth embodiment of the invention.

FIG. 12 is a block diagram showing a configuration for realizing the operation shown in the timing chart described above.

In the communication apparatus of FIG. 12, when power starts being supplied, a controller 1216 brings the state of the home apparatus into a disconnected state. Then, as a result of a signal 1215 being fed from the controller 1216 to a tone generator 1203, a short tone signal 1204 is generated by the tone generator 1203, is then fed to a transmitter 1205, and is then converted into a transmitted signal 1206, which is then transmitted from the transmitter 1205. Used as the transmitter here is, for example in the case of optical communication, an LED (light-emitting diode), LD (laser diode), or the like.

On the other hand, when a received signal 1207 is received by a receiver 1208, it is converted into an SD signal 1209, and is then fed to an SD checker 1210. The SD checker 1210 checks which of a short tone signal or a long tone signal has been received on the basis of the SD signal 1209 observed in the periods other than the periods in which the home apparatus transmits a tone signal. Used as the receiver here is, for example in the case of optical communication, a PD (photodiode) or the like.

When the SD checker 1210 recognizes a short tone signal, a check signal 1211 indicating the result of the checking is fed to a counter 1212, which is thereby incremented by one. When the count of the counter 1212 reaches a prescribed number, a signal 1214 is fed to the controller 1216 to notify it that the number of short tone signals received has reached the prescribed number. On recognizing that the number of short tone signals received has reached the prescribed number, the controller 1216 feeds a data communication request enable signal 1217 to a data communication request generator 1201.

On receiving the data communication request enable signal 1217, the data communication request generator 1201 feeds a data communication request signal 1202 to the controller 1216. Here, if the controller 1216 recognizes that it has not received a long tone signal on the basis of the check signal 1213 fed from the SD checker 1210, the controller 1216 transmits a signal 1215 so that the tone generator 1203 generates a long tone signal.

Then, a long tone signal 1204 is generated by the tone generator 1203, is then fed to the transmitter 1205, and is then converted into a transmitted signal 1206 and then transmitted by the transmitter 1205. In a case where, in this way, a transmitted signal 1206 converted from a long tone signal 1204 is transmitted, when the long tone signal 1204 is fed from the tone generator 1203 to the transmitter 1205, a generation result signal 1218 is fed from the tone generator 1203 to the controller 1216. Thus, the controller 1216 recognizes that a long tone signal has been transmitted, and determines the home apparatus to act as a parent apparatus.

On the other hand, if, before the controller 1216 feeds the signal 1215 to the tone generator 1203 to instruct it to generate a long tone signal 1204, the controller 1216 recognizes that it has received a long tone signal on the basis of the check signal 1213 fed from the SD checker 1210, the controller 1216 keeps the home apparatus acting as a child apparatus. Then, the controller 1216 feeds the signal 1215 to the tone generator 1203 to instruct it to generate a short tone signal 1204. By configuring a communication apparatus in this way, it is possible to realize the operation shown in the timing chart of FIG. 11 described above, and thereby determine a parent-child relationship without fail.

Figure 13:
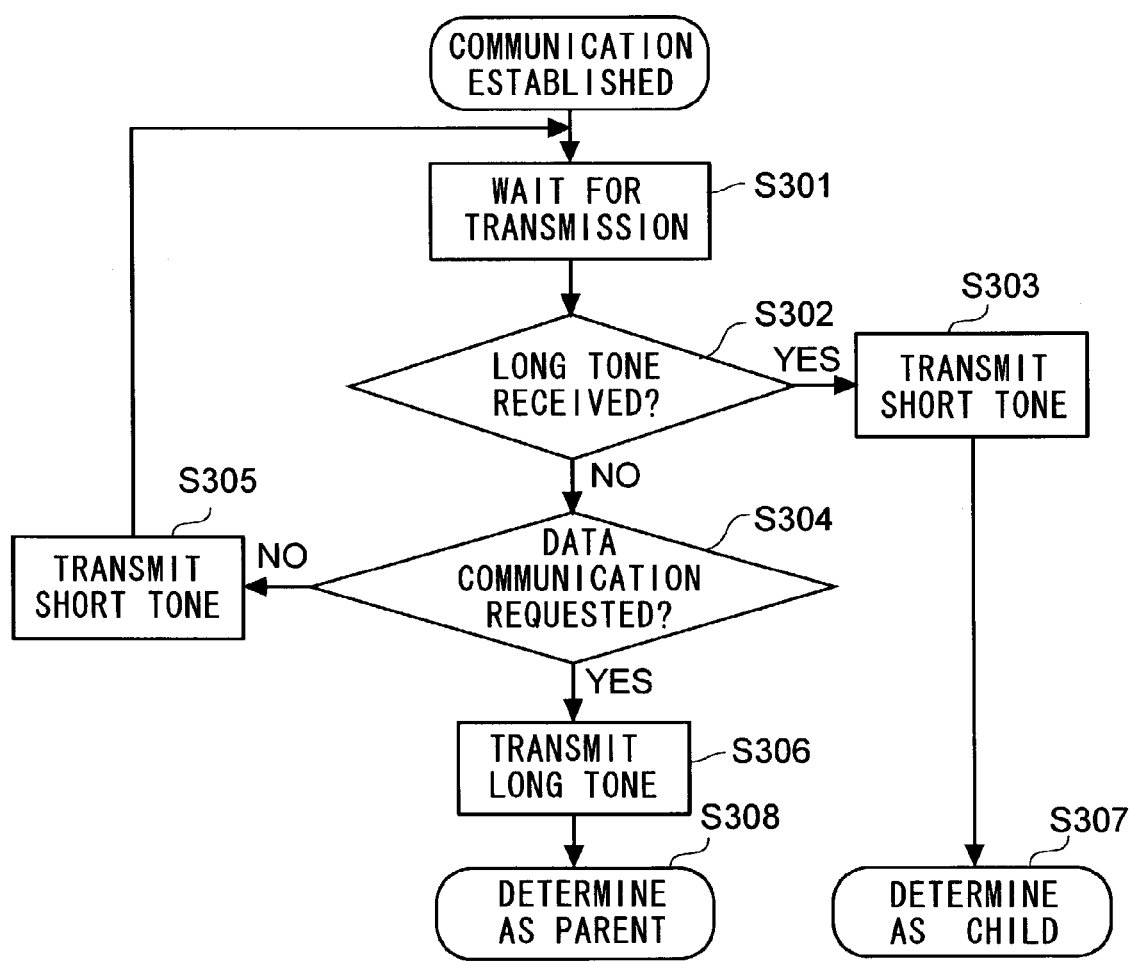
FIG. 13 is a flow chart of the procedure executed by an apparatus to perform data communication in the fifth embodiment of the invention.

FIG. 13 is a flow chart showing the operation, after the establishment of connection, of the communication apparatus configured as shown in FIG. 12.

After the home apparatus goes into a connection-established state, in step S301, it waits for the time at which it will transmit a tone signal. When the time comes at which the home apparatus transmits a tone signal, the procedure proceeds to step S302.

In step S302, whether a long tone signal is received or not is checked. The SD checker 1210 checks this, and feeds check signals 1211 and 1213 to the counter 1212 and the controller 1216, respectively. If a long tone signal is recognized to have been received, the procedure proceeds to step S303, and, if a short tone signal is recognized to have been received, the procedure proceeds to step S304.

In step S303, a short tone signal is transmitted. A short tone signal 1204 is generated by the tone generator 1203, and is then converted into a transmitted signal 1206 and then transmitted by the transmitter 1205. Thereafter, in step S307, the controller 1216 determines the home apparatus to act as a child apparatus.

In step S304, the controller 1216 checks whether a data communication request signal 1202 has been fed from the data communication request generator 1201 or not. If no data communication request signal 1202 has been fed, the procedure proceeds to step S305, and, if a data communication request signal 1202 has been fed, the procedure proceeds to step S306.

In step S305, a short tone signal is transmitted. A short tone signal 1204 is generated by the tone generator 1203, and is then converted into a transmitted signal 1206 and then transmitted by the transmitter 1205. Thereafter, the procedure proceeds to step S301.

In step S306, a long tone signal is transmitted. A long tone signal 1204 is generated by the tone generator 1203, and is then converted 1205 into a transmitted signal 1206 and then transmitted by the transmitter. Thereafter, in step S308, the controller 1216 determines the home apparatus to act as a parent apparatus.

In this way, it is possible to determine a parent-child relationship after the establishment of connection immediately before the start of data communication. On the basis of the parent-child relationship determined here, the two apparatuses each decide which to use of the two sets of transmission properties with which they are provided. For example, assuming that the parent apparatus uses a wavelength A and the child apparatus uses a wavelength B, even in the presence of stray light, the light from the two apparatuses can be separated on the basis of the difference in wavelength. This makes it possible to accurately detect disconnection.

Embodiment 6

Now, a sixth embodiment of the invention will be described with reference to FIGS. 12, 14, and 15.

According to the method of this embodiment, even after the establishment of connection, two apparatuses both act as child apparatuses, and, between them, a provisional parent-child relationship is determined on the occasion of a transition to a data-transfer-enabled state, and then a definite parent-child relationship is determined according to how they exchange long tones.

Figure 14:
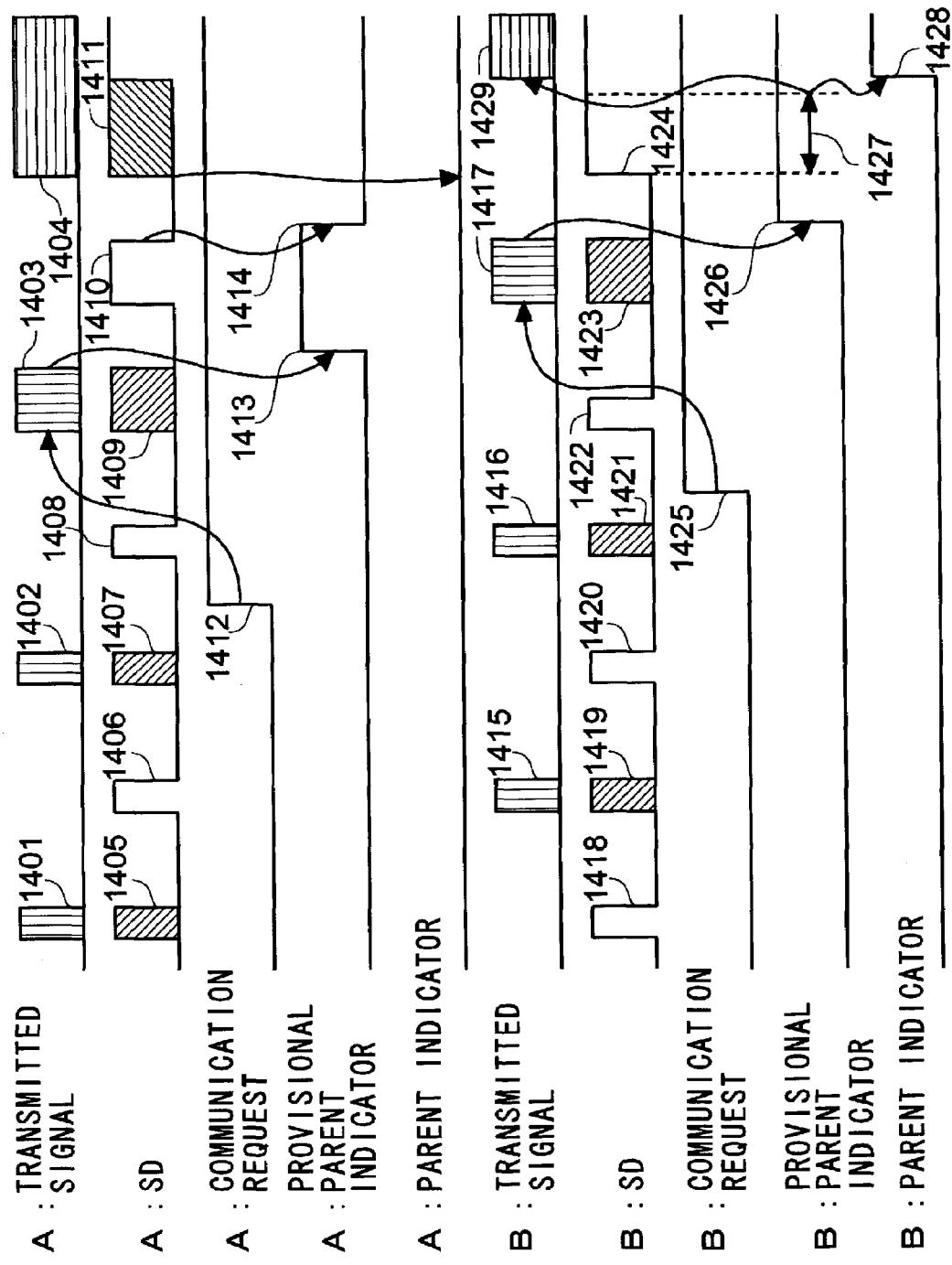
FIG. 14 is a diagram showing the waveforms of relevant signals to illustrate the principle of operation in a sixth embodiment of the invention.

FIG. 14 is a timing chart showing the principle of operation. In FIG. 14, as in the fifth embodiment (FIG. 11), the establishment of connection has already been detected through exchange of tone signals. In the following descriptions, the apparatus in which a request for data communication occurs first is called the apparatus A, and the apparatus in which a request for data communication occurs later is called the apparatus B.

After the apparatuses A and B both have gone into a connection-established state, as in the fifth embodiment, the establishment of connection is detected through exchange of tone signals. At this time, the apparatuses A and B both act as child apparatuses. Specifically, as shown in FIG. 14, the apparatus A transmits short tone signals 1401 and 1402, and the apparatus B transmits short tone signals 1415 and 1416. In this way, in the connection-established state in which the apparatuses are exchanging short tone signals, the parent indicator signal remains low in both the apparatuses A and B.

Thereafter, first, the apparatus A produces a data communication request signal 1412 within itself. Moreover, the apparatuses A and B ignore the SD signal in periods corresponding to a predetermined margin added to each of the periods 1405, 1407, 1409, 1411, 1419, 1421, and 1423 in which the home apparatus is transmitting a signal, and checks whether the SD signal is active or not in the other periods so as to detect the presence of a tone signal from the partner apparatus. Thus, the apparatus A detects, on the basis of the SD signal 1406, the short tone signal 1415 from the apparatus B, and the apparatus B detects, on the basis of the SD signals 1418 and 1420, the short tone signals 1401 and 1402 from the apparatus A.

Accordingly, when the data communication request signal becomes active, the apparatus A detects the SD signal 1408 and thereby recognizes the short tone signal 1416 transmitted from the apparatus B, and then transmits a long tone signal 1403. In this embodiment, used as the long tone signal is a tone signal three times as long as the short tone signal.

After transmitting the long tone signal 1403 in this way, the apparatus A, with the provisional parent indicator signal 1413 turned high, is determined to act as a provisional parent apparatus. On the other hand, on the part of the apparatus B, when, after the data communication request signal 1425 is generated, an SD signal 1422 is detected and the long tone signal 1403 is erroneously detected as a short tone signal as a result of a fault in the communication path, the apparatus B transmits a long tone signal 1417, and is then, with the provisional parent indicator signal 1426 turned high, determined to act as a provisional parent apparatus.

Thereafter, when the apparatus A detects the long tone signal 1417 on the basis of the SD signal 1410, it recognizes that the apparatus B has gone into a transfer-enabled state and determined to act as a provisional parent apparatus. Then, with the provisional parent indicator signal 1414 turned low and the parent indicator signal kept low, the apparatus A is determined as a child apparatus. In the apparatus A thus determined to act as a child apparatus, the data communication request signal is already high, and thus the apparatus A transmits a continuous signal 1404 as a data signal.

On the other hand, in the apparatus B that has received the continuous signal 1404, when the apparatus B recognizes that the SD signal 1424 remains active for a period 1427 longer than a long tone signal, it recognizes that the apparatus A has gone into a data-transfer-enabled state and determined to act as a child apparatus. Then, since the data communication request signal is already high, the apparatus B, with the parent indicator signal 1428 turned high, is determined to act as a parent apparatus, and simultaneously transmits a continuous signal 1429 as a data signal.

In this way, by changing the type of tone signal transmitted on the occasion of a transition to a data-transfer-enabled state and determining the apparatus that has received a changed tone signal to act as a parent apparatus, it is possible to determine the parent-child relationship between two communication apparatuses without fail even when a fault occurs in the communication path.

In this embodiment also, as in the fifth embodiment, the operation shown in the timing chart described above is realized by the use of the configuration shown in the block diagram of FIG. 12. Therefore, in the following description, only differences from the communication apparatus of the fifth embodiment are explained, and the explanations of such operations as are found also in the fifth embodiment will not be repeated as already given there.

When the number of short tone signals received has reached the prescribed number, and the data communication request generator 1201 fed with a data communication request enable signal 1217 from the controller 1216 outputs a data communication request signal 1202, if the controller 1216 recognizes that it has not received a long tone signal on the basis of a check signal 1213 fed from the SD checker 1210, the controller 1216 feeds a signal 1215 to instruct the tone generator 1203 to generates a long tone signal.

Then, a long tone signal 1204 is generated by the tone generator 1203, is then transmitted to the transmitter 1205, and is then converted into a transmitted signal 1206 and then transmitted by the transmitter 1205. Here, when the long tone signal 1204 is fed from the tone generator 1203 to the transmitter 1205, the tone generator 1203 feeds a generation result signal 1218 to the controller 1216. The controller 1216 thus recognizes the transmission of a long tone signal, and determines the home apparatus to act as a provisional parent apparatus.

On the other hand, when, before the controller 1216 feeds the signal 1215 to the tone generator 1203 to instruct it to generate a long tone signal 1204, the controller 1216 recognizes the reception of a long tone signal on the basis of the check signal 1213 fed from the SD checker 1210, the controller 1216 determines the home apparatus to act as a provisional child apparatus.

Then, when the controller 1216 is being fed with the data communication request signal 1202 from the data communication request generator 1201, the controller 1216 feeds a signal 1215 to the tone generator 1203 to instruct it to generate a continuous signal, and determines the home apparatus to act as a child apparatus. Here, when the tone generator 1203 fed with the signal 1215 feeds a continuous signal 1204 to the transmitter 1205, the transmitter 1205 converts the continuous signal 1204 into a transmitted signal 1206 and then transmits it.

When the controller 1216, after being determined to act as a provisional parent apparatus, recognizes the reception of a long tone signal on the basis of the check signal 1213 fed from the SD checker 1210, the controller 1216 switches the home apparatus to a provisional child apparatus. Then, while being fed with the data communication request signal 1202 from the data communication request generator 1201, the controller 1216 immediately feeds a signal 1215 to the tone generator 1203 to instruct it to generate a continuous signal, and determines the home apparatus to act as a child apparatus. If no data communication request signal 1202 occurs before the time at which the next transmission takes place, the tone generator 1203 is instructed to generate a short tone signal.

By configuring a communication apparatus in this way, it is possible to realize the operation shown in the timing chart of FIG. 14 described above, and thereby determine a parent-child relationship without fail.

Figure 15:
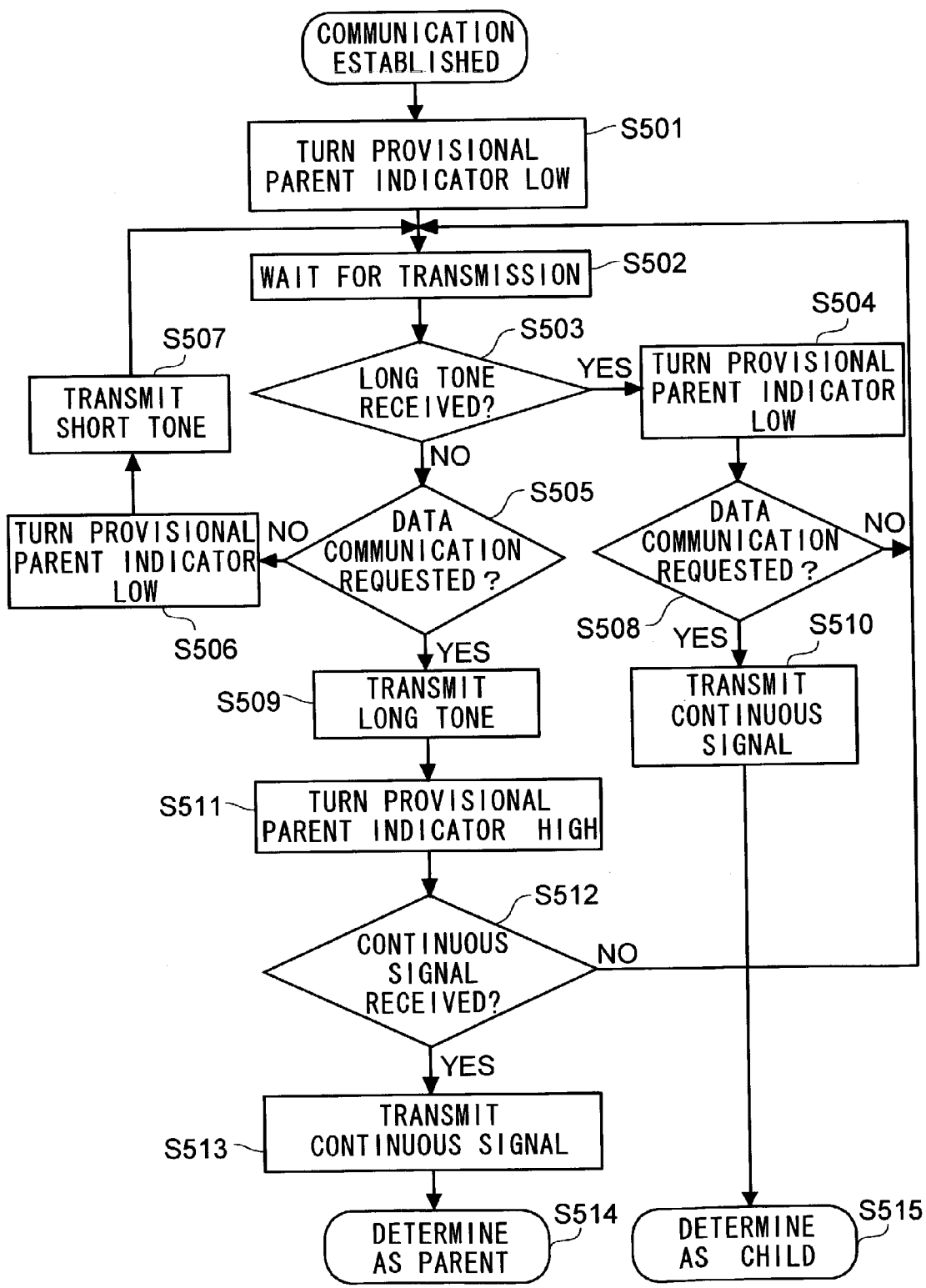
FIG. 15 is a flow chart of the procedure executed by an apparatus to perform data communication in the sixth embodiment of the invention.

FIG. 15 is a flow chart showing the operation, after the establishment of connection, of the communication apparatus configured as shown in FIG. 12.

After the home apparatus goes into a connection-established state, in step S501, the provisional parent indicator signal is turned low to determine a provisional parent-child relationship. When the provisional parent indicator signal is turned low, the procedure proceeds to step S502.

In step S502, the home apparatus waits for the time at which it will transmit a tone signal. When the time comes at which the home apparatus transmits a tone signal, the procedure proceeds to step S503.

In step S503, whether a long tone signal has been received during a transition from step S501 to step S502 or not is checked. The SD checker 1210 checks this, and feeds check signals 1211 and 1213 to the counter 1212 and the controller 1216, respectively. If a long tone signal is recognized to have been received, the procedure proceeds to step S504, and, if a short tone signal is recognized to have been received, the procedure proceeds to step S505.

In step S504, the provisional parent indicator signal is turned low. When the controller 1216 turns the provisional parent indicator signal low and determines the home apparatus to act as a provisional child apparatus, the procedure proceeds to step S508.

In step S505, the controller 1216 checks whether a data communication request signal 1202 is fed from the data communication request generator 1201 or not. If no data communication request signal 1202 is fed, the procedure proceeds to step S506, and, if a data communication request signal 1202 is fed, the procedure proceeds to step S509.

In step S506, as in step S504, the provisional parent indicator signal is turned low. When the controller 1216 turns the provisional parent indicator signal low and determines the home apparatus to act as a provisional child apparatus, the procedure proceeds to step S507.

In step S507, a short tone signal is transmitted. A short tone signal 1204 is generated by the tone generator 1203, and is then converted into a transmitted signal 1206 and then transmitted by the transmitter 1205. The procedure then proceeds to step S502.

In step S508, as in step S505, the controller 1216 checks whether a data communication request signal 1202 is fed from the data communication request generator 1201 or not. If no data communication request signal 1202 is fed, the procedure proceeds to step S502, and, if a data communication request signal 1202 is fed, the procedure proceeds to step S510.

In step S509, a long tone signal is transmitted. A long tone signal 1204 is generated by the tone generator 1203, and is then converted into a transmitted signal 1206 and then transmitted by the transmitter 1205. The procedure then proceeds to step S511.

In step S510, a continuous signal is transmitted. A continuous signal 1204 is generated by the tone generator 1203, and is then converted into a transmitted signal 1206 and then transmitted by the transmitter 1205. Thereafter, in step S515, the controller 1216 determines the home apparatus to act as a child apparatus.

In step S511, the provisional parent indicator signal is turned high. When the controller 1216 turns the provisional parent indicator signal high and determines the home apparatus to act as a provisional parent apparatus, the procedure proceeds to step S512.

In step S512, whether a continuous signal is received or not is checked. The SD checker 1210 checks this, and feeds a check signal 1213 to the controller 1216. If a continuous signal is recognized to have been received, the procedure proceeds to step S513, and, if no continuous signal is recognized to have been received, the procedure proceeds to step S502.

In step S513, as in step S510, a continuous signal is transmitted. A continuous signal 1204 is generated by the tone generator 1203, and is then converted into a transmitted signal 1206 and then transmitted by the transmitter 1205. Thereafter, in step S514, the controller 1216 determines the home apparatus to act as a parent apparatus.

In this way, it is possible to determine a parent-child relationship without fail after the establishment of connection immediately before the start of data communication even when a fault occurs in the communication path. On the basis of the parent-child relationship determined here, the two apparatuses each decide which to use of the two sets of transmission properties with which they are provided. For example, assuming that the parent apparatus uses a wavelength A and the child apparatus uses a wavelength B, even in the presence of stray light, the light from the two apparatuses can be separated on the basis of the difference in wavelength. This makes it possible to accurately detect disconnection.

Embodiment 7

Now, a seventh embodiment of the invention will be described with reference to FIGS. 16, 17, and 18.

According to the method of this embodiment, the timing with which tone signals are transmitted after the end of data communication is determined according to the parent-child relationship determined during data communication.

Figure 16:
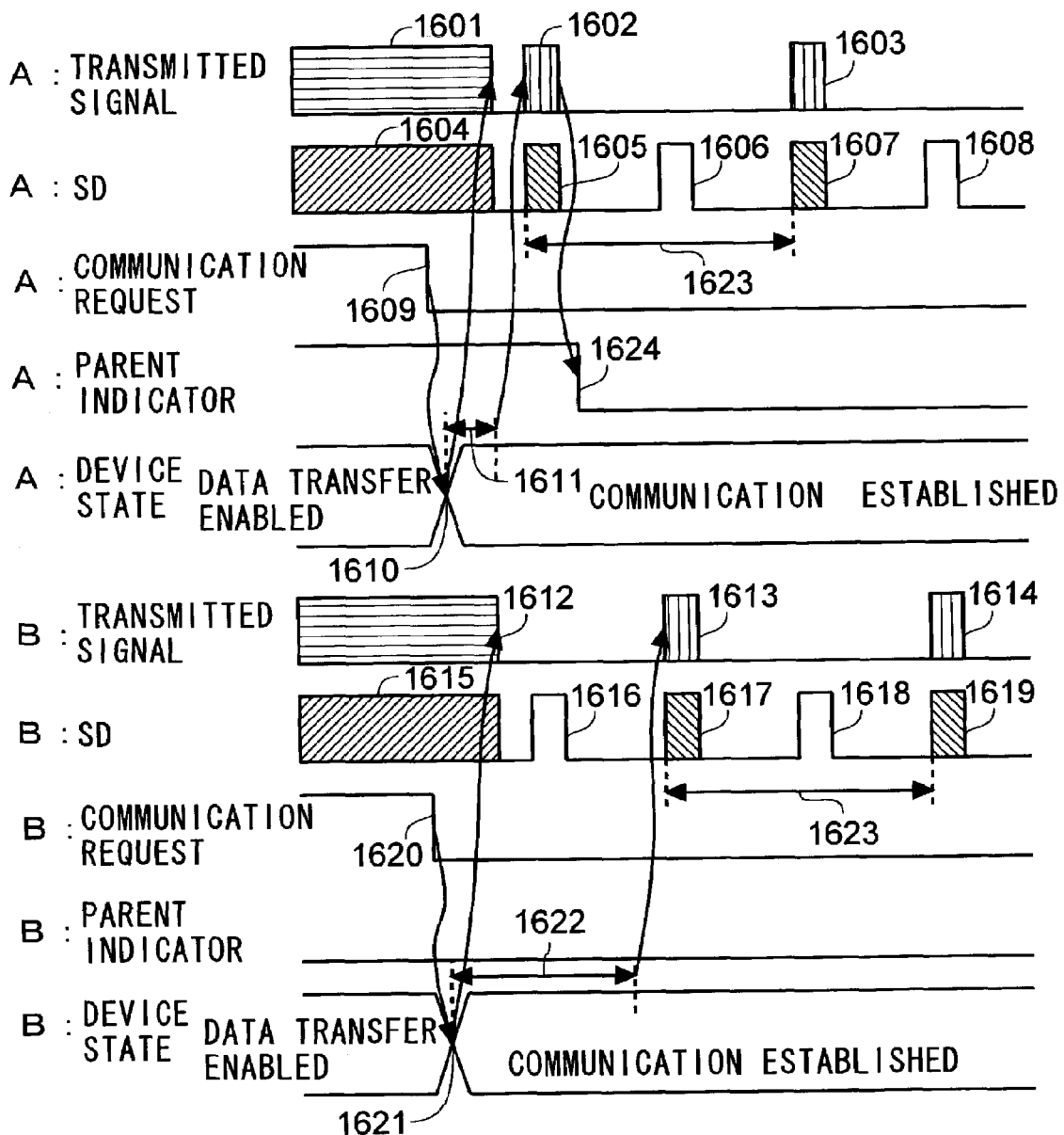
FIG. 16 is a diagram showing the waveforms of relevant signals to illustrate the principle of operation in a seventh embodiment of the invention.

FIG. 16 is a timing chart showing the principle of operation. In FIG. 16, the apparatus determined to act as a parent apparatus is called the apparatus A, and the apparatus determined to act as a child apparatus is called the apparatus B. Moreover, it is assumed that the apparatuses A and B have ended data communication at almost the same time.

At almost the same time, within the apparatus A, a data communication request signal 1609 turns low and thereby a request for data communication is cancelled, and, within the apparatus B, a data communication request signal 1620 turns low and thereby a request for data communication is cancelled. As a result, the apparatus A, at a time point 1610, shifts from a data-transfer-enabled state to a communication-established state, and the apparatus B, at a time point 1621, shifts from a data-transfer-enabled state to a communication-established state. Thereafter, the apparatus A stops generating a continuous signal 1601 as a data signal, and the apparatus B stops generating a continuous signal 1612 as a data signal.

In a case where the apparatuses A and B shift from a data-transfer-enabled state to a connection-established state at almost the same time in this way, the apparatus A, which, with the parent indicator signal high, is acting as a parent apparatus, transmits a tone signal 1602 after a lapse of a period 1611 after the transition, and the apparatus B, which, with the parent indicator signal low, is acting as a child apparatus, transmits a tone signal 1613 after a lapse of a period 1622 after the transition. Then, the apparatus A turns the parent indicator signal 1624 low so that the home apparatus ceases to act as a parent apparatus.

Here, the period 1611 is sufficiently shorter than the period 1623 of the tone signal, and the period 1622 equals about half the period 1623 of the tone signal. Thus, the tone signals 1613 and 1614 transmitted from the apparatus B are transmitted with a delay of half the period relative to the tone signals 1602 and 1603 transmitted from the apparatus A.

Moreover, the apparatuses A and B ignore the SD signal for periods corresponding to a predetermined margin added to each of the periods 1604, 1605, 1607, 1615, 1617, and 1619 in which the home apparatus is transmitting a signal, and checks whether the SD signal is active or not in the other periods. Thus, the apparatus A detects the tone signals 1613 and 1614 transmitted from the apparatus B on the basis of the SD signals 1606 and 1608, and the apparatus B detects the tone signals 1602 and 1603 transmitted from the apparatus A on the basis of the SD signals 1616 and 1618.

In this way, after the end of data communication, by shifting the timing with which tone signals are transmitted by half the period on the basis of the parent-child relationship, it is possible to permit the two communication apparatuses to confirm each other and thereby maintain a connection-established state without shifting to a disconnected state.

Figure 17:
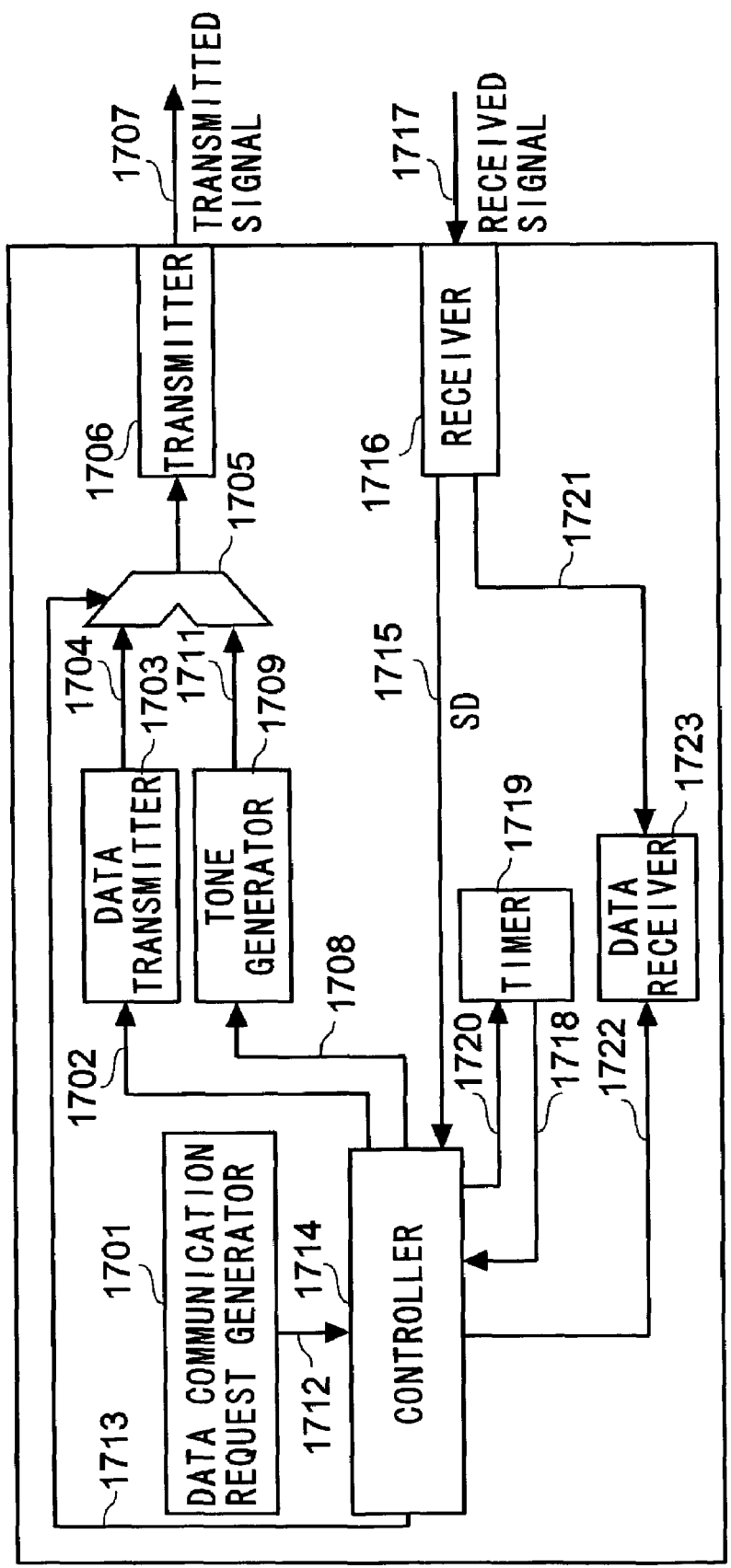
FIG. 17 is a block diagram in the seventh embodiment of the invention.

FIG. 17 is a block diagram showing a configuration for realizing the operation shown in the timing chart described above.

In the communication apparatus of FIG. 17, when a data communication request generator 1701 is feeding a high level as a data communication request signal 1712 to a controller 1714, i.e., in a data-transfer-enabled state, the controller 1714 feeds a signal 1702 to the data transmitter 1703 to instruct it to feed data 1704 to a multiplexer 1705.

At this time, the controller 1714 feeds a select signal 1713 to the multiplexer 1705 to instruct it to select a data signal 1704 output from the data transmitter 1703 and feed it to a transmitter 1706. The data signal 1704 output from the multiplexer 1705 is converted into a transmitted signal 1707 and then transmitted by the transmitter 1706. Used as the transmitter here is, for example in the case of optical communication, an LED (light-emitting diode), an LD (laser diode), or the like.

On the other hand, a received signal 1717 is converted by a receiver 1716 into an SD signal 1715 and received data 1721. In the data-transfer-enabled state, when the SD signal 1715 fed from the receiver 1716 to the controller 1714 is high, the controller 1714 feeds a signal 1722 to a data receiver 1723 to instruct it to validate the data signal 1721 fed from the receiver 1716 to the data receiver 1723.

Here, the data communication request generator 1701 feeds a low level as a data communication request signal 1712 to the controller 1714 and thereby cancels the request for data communication. As a result, the controller 1714 shifts the state of the home apparatus from a data-transfer-enabled state to a connection-established state. At this time, if the home apparatus has been acting as a parent apparatus during data communication, it is first determined to act as a child apparatus by the controller 1714.

Then, the controller 1714 feeds a signal 1708 to a tone generator 1709 to instruct it to generate a tone signal 1711, and feeds a select signal 1713 to the multiplexer 1705 to instruct it to select the tone signal 1711 and feeds it to the transmitter 1706. The transmitter 1706 converts the tone signal 1711 fed from the multiplexer 1705 into a transmitted signal 1707 and transmits it.

On the other hand, if the home apparatus has been acting as a child apparatus during data communication, first, the controller 1714 feeds a select signal 1713 to the multiplexer 1705 to instruct it to select the tone signal 1711 fed from the tone generator 1709 and feed it to the transmitter 1706. Then, the controller 1714 feeds a signal 1720 to a timer 1719 to initialize and then restart it. The timer 1719, after a lapse of half the period of the tone signal, feeds a signal 1718 to the controller 1714 to make it recognize that half the period of the tone signal has elapsed.

When the controller 1714 recognizes that half the period of the tone signal has elapsed after the transition to the connection-established state, the controller 1714 feeds a signal 1708 to the tone generator 1709 to instruct it to generate a tone signal 1711. Then, the transmitter 1706 converts the tone signal 1711 fed from the multiplexer 1705 into a transmitted signal 1707 and transmits it.

On the occasion of this transition to the connection-established state, after the data communication request generator 1701 turns the data communication request signal 1712 low until the tone generator 1711 generates and outputs the first tone signal, the controller 1714 does not regard the SD signal 1715 received by the receiver 1716 as valid. Moreover, after the first tone signal 1711 is converted into a transmitted signal 1707 and transmitted, when the receiver 1716 receives a received signal 1717, i.e., a tone signal 1711 from the partner apparatus, the exchange of tone signals with the partner apparatus is continued until the data communication request signal 1712 turns high again.

Figure 18:
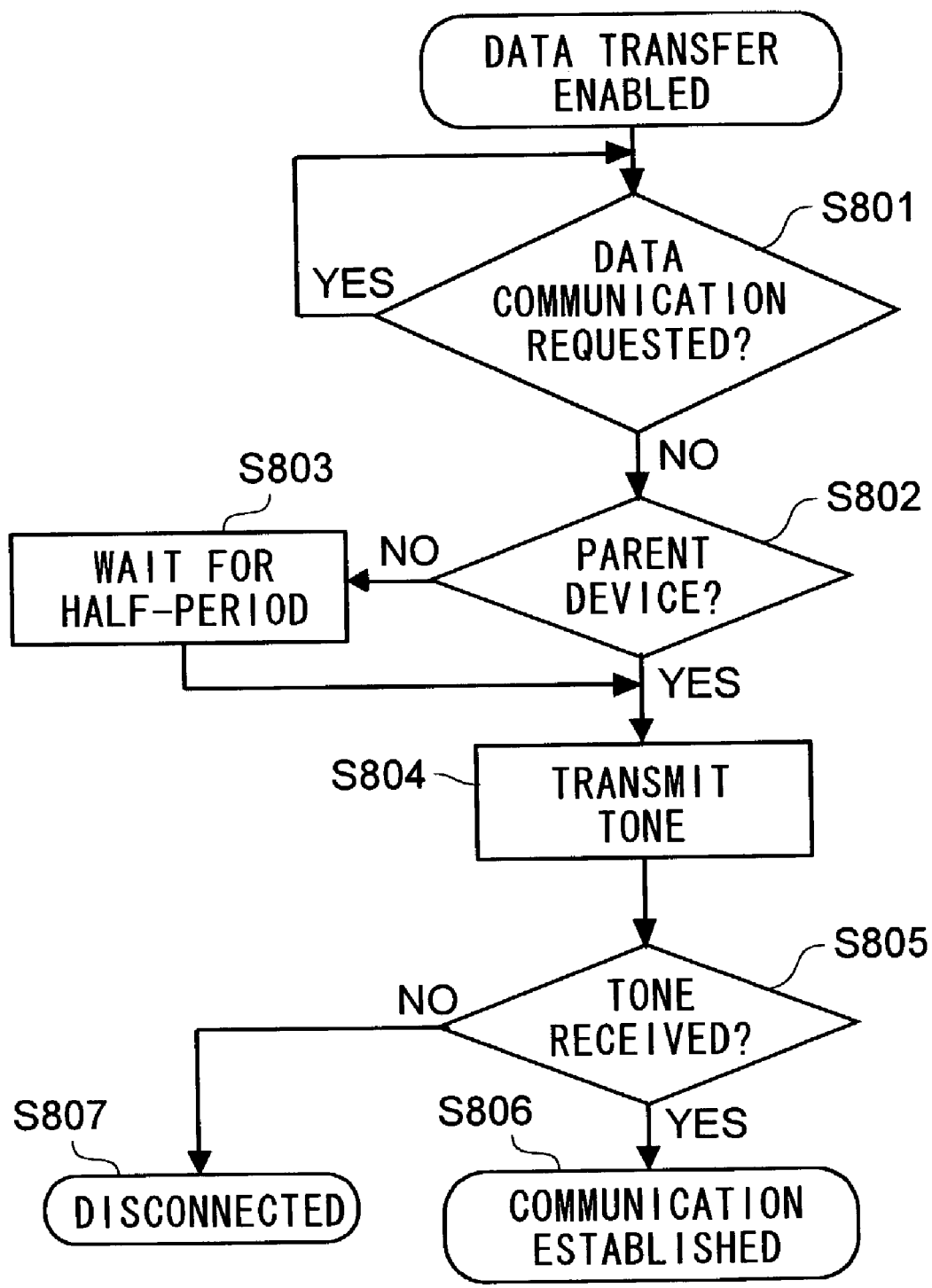
FIG. 18 is a flow chart of the procedure executed by an apparatus to establish connection in the seventh embodiment of the invention.

FIG. 18 is a flow chart showing the operation, after the establishment of connection, of the communication apparatus configured as shown in FIG. 17.

When the home apparatus is in a data-transfer-enabled state, in step S801, whether the data communication request signal 1712 fed from the data communication request generator 1701 to the controller 1714 is high or not is checked. If the data communication request signal 1712 is high, the procedure proceeds back to step S801; if the data communication request signal 1712 is low, the procedure proceeds to step S802.

In step S802, whether the home apparatus has been acting as a parent apparatus in the data-transfer-enabled state or not is checked. This is checked according to whether the parent indicator signal determined by the controller 1714 is high or not. If the parent indicator signal is low, i.e., if the home apparatus has been acting as a child apparatus, the procedure proceeds to step S803; if the parent indicator signal is high, i.e., if the home apparatus has been acting as a parent apparatus, the procedure proceeds to step S804.

In step S803, the timer 1719 is operated to produce a wait lasting for half the period of the tone signal. When the controller 1714 recognizes that half the period of the tone signal has elapsed, the procedure proceeds to S804.

In step S804, a tone signal is transmitted. A tone signal 1711 generated by the tone generator 1709 is selected by the multiplexer 1705, and is then converted into a transmitted signal 1707 and then transmitted by the transmitter 1706. When the transmitted signal 1707 is transmitted, the procedure proceeds to step S805.

In step S805, whether, after the transmission of the tone signal until the transmission of the next tone signal, a tone signal from the partner apparatus is received or not is checked. If a tone signal from the partner apparatus is recognized on the basis of an SD signal 1715 generated by the receiver 1716, the procedure proceeds to step S806, where the controller 1714 shifts the state of the home apparatus to a connection-established state. If no tone signal from the partner apparatus is recognized, the procedure proceeds to step S807, where the controller 1714 shifts the state of the home apparatus to a disconnected state.

In this way, on the occasion of a transition from a data-transfer-enabled state to a connection-established state, by making the two apparatuses generate tone signals with shifted periods from each other, it is possible to achieve a transition to the connection-established state without fail.

Embodiment 8

Now, an eighth embodiment of the invention will be described with reference to FIGS. 17, 19, and 20.

According to the method of this embodiment, with whatever timing the two apparatuses end data communication, they transmit tone signals with different timing.

Figure 19:
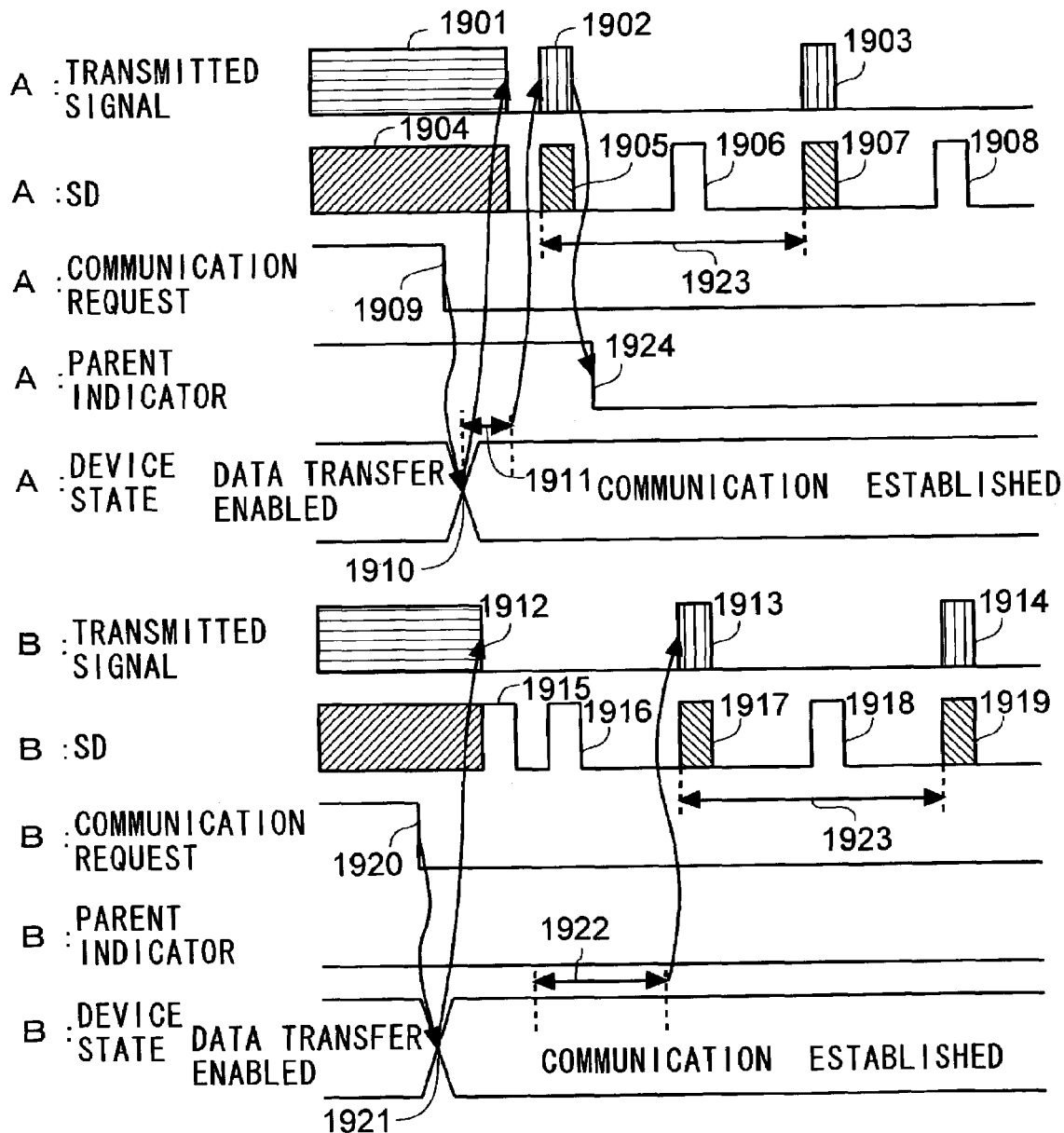
FIG. 19 is a diagram showing the waveforms of relevant signals to illustrate the principle of operation in an eighth embodiment of the invention.

FIG. 19 is a timing chart showing the principle of operation. In FIG. 19, the apparatus determined to act as a parent apparatus is called the apparatus A, and the apparatus determined to act as a child apparatus is called the apparatus B. Moreover, it is assumed that the apparatus B ends data communication first.

When, within the apparatus B, a data communication request signal 1920 turns low and thereby a request for data communication is cancelled, the apparatus B, at a time point 1921, shifts from a data-transfer-enabled state to a communication-established state. Then, the apparatus B stops generating a continuous signal 1912 as a data signal. Thereafter, when, within the apparatus A, a data communication request signal 1909 turns low and thereby a request for data communication is cancelled, the apparatus A, at a time point 1910, shifts from a data-transfer-enabled state to a communication-established state. Then, the apparatus A stops generating a continuous signal 1901 as a data signal.

In a case where the apparatuses A and B shift from a data-transfer-enabled state to a connection-established state in the order B then A in this way, there exists a period in which the apparatus B is in a connection-established state and the apparatus A is in a data-transfer-enabled state. In this period, the apparatus A transmits a continuous signal as a data signal, and therefore the apparatus B detects an SD signal 1915. Thus, the apparatus B, which is acting as a child apparatus, waits for the time point at which the SD signal 1915 turns low.

Thereafter, when, in the apparatus B, the signal 1901 transmitted from the apparatus A ends and the SD signal 1915 turns low, the apparatus B, since the home apparatus is acting as a child apparatus, transmits a tone signal 1913 at the end of a period 1922. On the other hand, the apparatus A, after the transition to the connection-established state, confirms that the SD signal is low, and transmits a tone signal 1902 at the end of a period 1911. At this time, the apparatus A turns a parent indicator signal 1924 low so that the home apparatus ceases to act as a parent apparatus.

Here, the period 1911 is sufficiently shorter than the period 1923 of the tone signal, and the period 1922 equals about half the period 1923 of the tone signal. Thus, the tone signals 1913 and 1914 transmitted from the apparatus B are transmitted with a delay of half the period relative to the tone signals 1902 and 1903 transmitted from the apparatus A.

Moreover, the apparatuses A and B ignore the SD signal for periods corresponding to a predetermined margin added to each of the periods 1904, 1905, 1907, 1917, and 1919 in which the home apparatus is transmitting a signal, and checks whether the SD signal is active or not in the other periods. Thus, the apparatus A detects the tone signals 1913 and 1914 transmitted from the apparatus B on the basis of the SD signals 1906 and 1908, and the apparatus B detects the tone signals 1902 and 1903 transmitted from the apparatus A on the basis of the SD signals 1916 and 1918.

In this way, after the two communication apparatuses both end data communication, and after the SD signal is then confirmed to turn low, by shifting the timing with which tone signals are transmitted by half the period on the basis of the parent-child relationship, it is possible to permit the two communication apparatuses to confirm each other and thereby maintain a connection-established state without shifting to a disconnected state.

In this embodiment also, as in the seventh embodiment, the operation shown in the timing chart described above is realized by the use of the configuration shown in the block diagram of FIG. 17. Therefore, in the following description, only differences from the communication apparatus of the seventh embodiment are explained, and the explanations of such operations as are found also in the seventh embodiment will not be repeated as already given there.

When the data communication request generator 1701 feeds a low level as a data communication request signal 1712 to the controller 1714 and thereby a request for data communication is cancelled, the controller 1714 shifts the state of the home apparatus from a data-transfer-enabled state to a connection-established state. Then, the controller 1714 checks whether the SD signal 1715 fed from the receiver 1716 has turned low or not and thereby checks whether the partner apparatus has ended data communication or not.

When the SD signal 1715 is confirmed as having turned low, if the home apparatus has been acting as a parent apparatus during data communication, first, a tone is transmitted and the home apparatus is determined to act as a child apparatus. Then, the controller 1714 feeds a signal 1708 to the tone generator 1709 to instruct it to generate a tone signal 1711, and feeds a select signal 1713 to the multiplexer 1705 to instruct it to select the tone signal 1711 and feed it to the transmitter 1706. The transmitter 1706 converts the tone signal 1711 fed from the multiplexer 1705 into a transmitted signal 1707 and transmits it.

If the home apparatus has been acting as a child apparatus during data communication, first, the controller 1714 feeds a select signal 1713 to the multiplexer 1705 to instruct it to select the tone signal 1711 fed from the tone generator 1709 and transmit it to the transmitter 1706.

The controller 1714, after confirming the SD signal 1715 as having turned low, feeds a signal 1720 to the timer 1719 to initialize and then restart it. The timer 1719, after a lapse of half the period of the tone signal, feeds a signal 1718 to the controller 1714 to make it recognize that half the period of the tone signal has elapsed.

When the controller 1714 recognizes that the partner apparatus has ended data communication and that half the period of the tone signal has elapsed, the controller 1714 feeds a signal 1708 to the tone generator 1709 to instruct it to generate a tone signal 1711. Then, the transmitter 1706 converts the tone signal 1711 fed from the multiplexer 1705 into a transmitted signal 1707 and transmits it.

On the occasion of this transition to the connection-established state, after, with the SD signal 1715 turned low, the controller 1714 confirms that the partner apparatus has ended data communication until the tone generator 1711 generates and outputs the first tone signal, the controller 1714 does not regard the SD signal 1715 received by the receiver 1716 as valid. Moreover, after the first tone signal 1711 is converted into a transmitted signal 1707 and transmitted, when the receiver 1716 receives a received signal 1717, i.e., a tone signal 1711 from the partner apparatus, the exchange of tone signals with the partner apparatus is continued until the data communication request signal 1712 turns high again.

Figure 20:
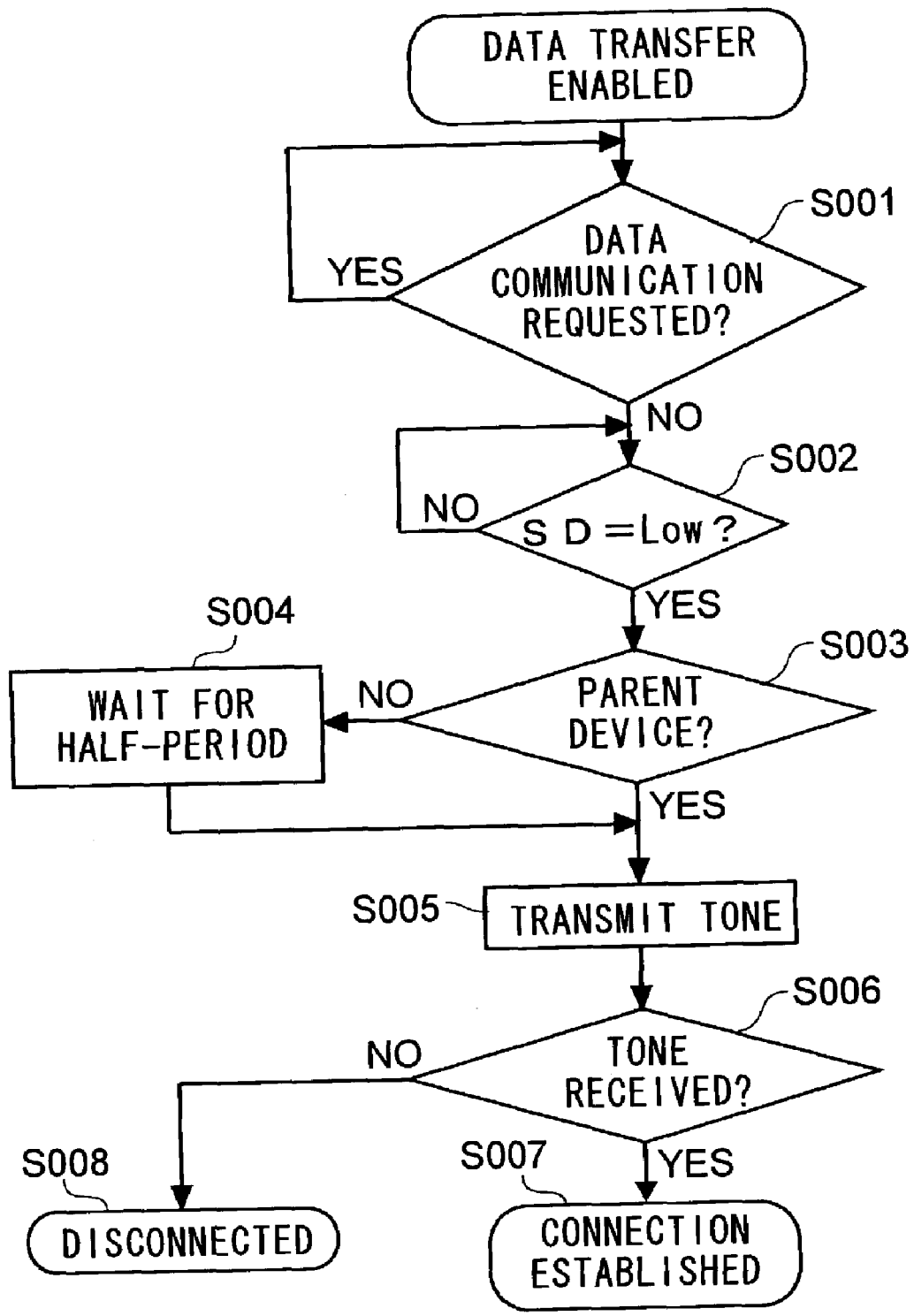
FIG. 20 is a flow chart of the procedure executed by an apparatus to establish connection in the eighth embodiment of the invention.

FIG. 20 is a flow chart showing the operation, after the establishment of connection, of the communication apparatus configured as shown in FIG. 17.

When the home apparatus is in a data-transfer-enabled state, in step S001, whether the data communication request signal 1712 fed from the data communication request generator 1701 to the controller 1714 is high or not is checked. If the data communication request signal 1712 is high, the procedure proceeds back to step S001; if the data communication request signal 1712 is low, the procedure proceeds to step S002.

In step S002, the controller 1714 checks whether the SD signal 1715 has turned low or not and thereby checks whether the partner apparatus has ended data communication or not. If the SD signal 1715 is high, the procedure proceeds back to step S002; if the SD signal 1715 is low, the procedure proceeds to step S003.

In step S003, whether the home apparatus has been acting as a parent apparatus in the data-transfer-enabled state or not is checked. This is checked according to whether the parent indicator signal determined by the controller 1714 is high or not. If the parent indicator signal is low, i.e., if the home apparatus has been acting as a child apparatus, the procedure proceeds to step S004; if the parent indicator signal is high, i.e., if the home apparatus has been acting as a parent apparatus, the procedure proceeds to step S005.

In step S004, the timer 1719 is operated to produce a wait lasting for half the period of the tone signal. When the controller 1714 recognizes that half the period of the tone signal has elapsed, the procedure proceeds to S005.

In step S005, a tone signal is transmitted. A tone signal 1711 generated by the tone generator 1709 is selected by the multiplexer 1705, and is then converted into a transmitted signal 1707 and then transmitted by the transmitter 1706. When the transmitted signal 1707 is transmitted, the procedure proceeds to step S006.

In step S006, whether, after the transmission of the tone signal until the transmission of the next tone signal, a tone signal from the partner apparatus is received or not is checked. If a tone signal from the partner apparatus is recognized on the basis of an SD signal 1715 generated by the receiver 1716, the procedure proceeds to step S007, where the controller 1714 shifts the state of the home apparatus to a connection-established state. If no tone signal from the partner apparatus is recognized, the procedure proceeds to step S008, where the controller 1714 shifts the state of the home apparatus to a disconnected state.

In this way, on the occasion of a transition from a data-transfer-enabled state to a connection-established state, after one communication apparatus that has ended data communication first confirms that the other communication apparatus has ended data communication, by making the two apparatuses generate tone signals with shifted periods from each other, it is possible to achieve a transition to the connection-established state without fail.

Embodiment 9

Now, a ninth embodiment of the invention will be described with reference to FIGS. 21, 22, and 23.

According to the method of this embodiment, on the occasion of a transition from a disconnected state to a connection-established state, the period of tone signals transmitted is selected randomly so that two apparatuses transmit tone signals with different timing.

Figure 21:
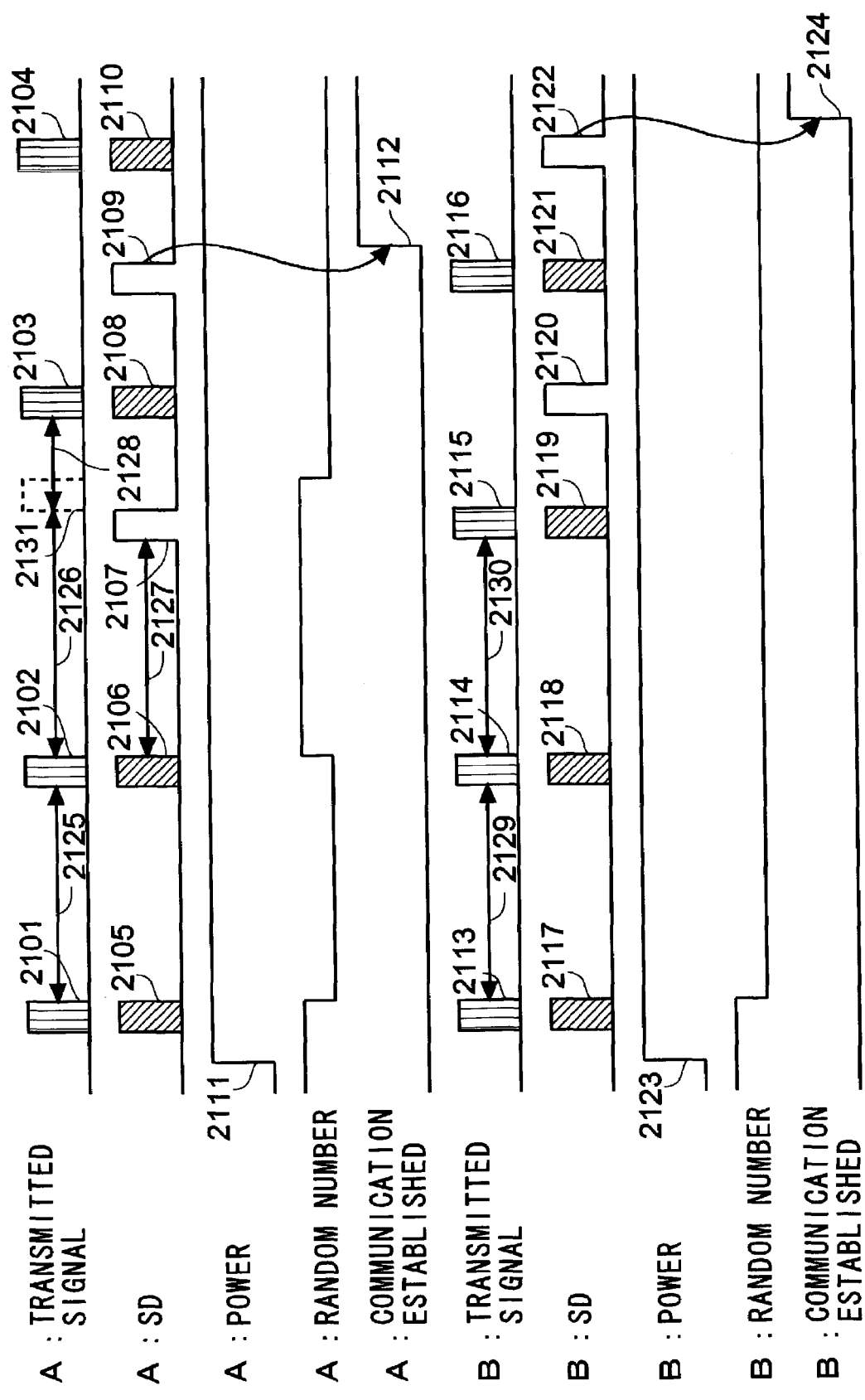
FIG. 21 is a diagram showing the waveforms of relevant signals to illustrate the principle of operation in a ninth embodiment of the invention.

FIG. 21 is a timing chart showing the principle of operation. In FIG. 21, it is assumed that power starts being supplied to the apparatuses A and B at almost the same time. The tone signals transmitted by the apparatuses A and B have a period of T and a width of T1, and, when an SD signal having a width greater than T1/2 is detected, a tone signal is recognized to be received.

At a time point 2111, power starts being supplied to the apparatus A, and, at a time point 2123, power starts being supplied to the apparatus B; that is, power starts being supplied to the apparatuses A and B at almost the same time. Then, the apparatus A transmits a tone signal 2101 and the apparatus B transmits a tone signal 2113 at almost the same time. The apparatuses A and B each ignore the SD signal for periods corresponding to a predetermined margin added to each of the periods 2105, 2106, 2108, 2110, 2117, 2118, 2119, and 2121 in which the home apparatus is transmitting a signal, and checks whether the SD signal is active or not in the other periods.

Accordingly, the apparatus A, in which the SD signal is regarded invalid in the period 2105 in which the tone signal 2101 is transmitted, cannot detect the tone signal 2113 transmitted from the apparatus B in almost the same period. Likewise, the apparatus B, in which the SD signal is regarded invalid in the period 2117 in which the tone signal 2113 is transmitted, cannot detect the tone signal 2101 transmitted from the apparatus A in almost the same period.

The apparatus A, in which a one-bit random-number signal is low after the transmission of the tone signal 2101, transmits a tone signal 2102 after a lapse of a period 2125 equal to the period T of the tone signal. Likewise, the apparatus B, in which a one-bit random-number signal is low after the transmission of the tone signal 2113, transmits a tone signal 2114 after a lapse of a period 2129 equal to the period T of the tone signal. This time also, the apparatuses A and B transmit the tone signals 2102 and 2114, respectively, with almost the same timing, and therefore neither of them can detect the tone signal from the partner apparatus.

The apparatus A, in which the one-bit random-number signal is high after the transmission of the tone signal 2102, tries transmitting a tone signal 2131 after a lapse of a period 2126, corresponding to T+α, longer than the period T of the tone signal. On the other hand, the apparatus B, in which the one-bit random-number signal is still low after the transmission of the tone signal 2114, transmits a tone signal 2115 after a lapse of a period 2130 equal to the period T of the tone signal.

This time, after the apparatus A transmits the tone signal 2102 and then the period 2127 equal to the period T of the tone signal elapses, the apparatus A can detect, on the basis of the SD signal 2107, the tone signal 2115 transmitted from the apparatus B. When the apparatus A detects the tone signal 2115 from the apparatus B in this way, the apparatus A inhibits the transmission of a tone signal 2131, and thereafter transmits a tone signal 2103 after a lapse of a period 2128 equal to half the period T/2 of the tone signal. Accordingly, the apparatus B, after transmitting the tone signal 2115, detects the tone signal 2103 transmitted from the apparatus A after a lapse of about half the period of the tone signal. When the apparatuses A and B detect the tone signals from each other in this way, they both turn the random-number signal low.

Thereafter, the apparatuses A and B transmit tone signals 2104 and 2116, respectively, about half the period of the tone signal apart from each other. When the apparatus A detects the tone signal 2116 from the apparatus B on the basis of the SD signal 2109, the number of times that the apparatus A has received tone signals reaches the prescribed number (in this example, two) necessary for the establishment of connection. Thus, the apparatus A turns high a connection-established flag 2112 indicating the establishment of connection, and shifts from a disconnected state to a connection-established state. Likewise, when the apparatus B detects the tone signal 2104 from the apparatus A on the basis of the SD signal 2122, the number of times that the apparatus B has received tone signals reaches the prescribed number necessary for the establishment of connection. Thus, the apparatus A turns a connection-established flag 2124 high, and shifts from a disconnected state to a connection-established state.

In this way, the timing with which to transmit a tone signal is switched according to the value of the random-number signal. Thus, even when, for example, power starts being supplied to two communication apparatuses at the same time and thus tone signals are transmitted at the same time, it is possible to make the two communication apparatuses transmit tone signals with different timing. This makes it possible to detect tone signals on the basis of the SD signal, and thus helps shorten the time required for the establishment of connection.

Figure 22:
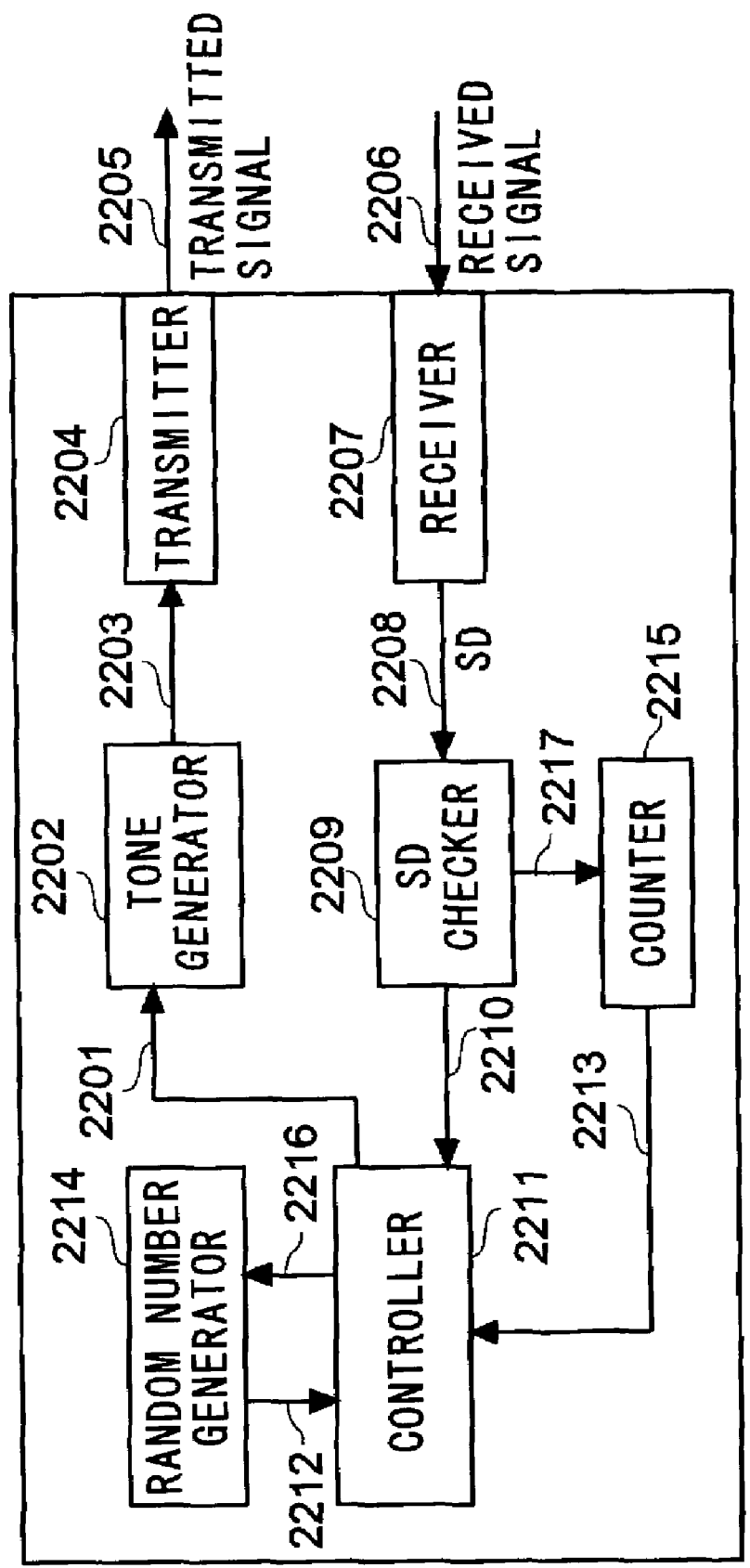
FIG. 22 is a block diagram in the ninth embodiment of the invention.

FIG. 22 is a block diagram showing a configuration for realizing the operation shown in the timing chart described above.

In the communication apparatus of FIG. 22, when power starts being supplied, the controller 2211 recognizes a disconnected state. Then, the controller 2211 determines, according to a random-number signal 2212 fed from a random number generator 2214, with which of predetermined periods Ta (Ta=T) and Tb (Tb=T+α) to determine the timing with which to transmit a tone signal.

Specifically, when a low level is fed as the random-number signal 2212 from the random number generator 2214, the controller 2211 chooses the period Ta, and thus, after a lapse of a period equal to the period Ta, the controller 2211 feeds a signal 2201 to a tone generator 2202 to instruct it to generate a tone signal 2203. On the other hand, when a high level is fed as the random-number signal 2212 from the random number generator 2214, the controller 2211 chooses the period Tb, and thus, after a lapse of a period equal to the period Tb, the controller 2211 feeds a signal 2201 to the tone generator 2202 to instruct it to generate a tone signal 2203.

On receiving the signal 2201 from the controller 2211, the tone generator 2202 generates the tone signal 2203 and feeds it to a transmitter 2204. The transmitter 2204 converts the tone signal 2203 fed from the tone generator 2202 into a transmitted signal 2205 and transmits it. Used as the transmitter here is, for example in the case of optical communication, an LED (light-emitting diode), an LD (laser diode), or the like.

On the other hand, when a received signal 2206 is received by a receiver 2207, it is converted into an SD signal 2208, which is then fed to an SD checker 2209. The SD checker 2209 checks whether a tone signal is received or not on the basis of the SD signal 2208 present in periods other than the periods in which the home apparatus is transmitting a tone signal. Used as the receiver here is, for example in the case of optical communication, a PD (photodiode) or the like.

When the SD checker 2209 recognizes a tone signal, a check signal 2217 indicating the result of the checking is fed to a counter 2215, which is thereby incremented by one. When the count of the counter 2215 reaches a prescribed number, a signal 2213 is fed to the controller 2211 to make it recognize that the number of tone signals received has reached the prescribed number.

Moreover, when the SD checker 2209 recognizes a tone signal, a check signal 2210 indicating the result of the checking is fed to the controller 2211. Then, after a lapse of a period equal to half the period (T/2) of the tone signal after the reception of the tone signal, the controller 2211 transmits a signal 2201 to the tone generator 2202 to instruct it to generate a tone signal 2203. At this time, the controller 2211 feeds a signal 2216 to the random number generator 2214 to instruct it to keep the random-number signal 2212 low all the time.

Furthermore, a signal 2213 is fed from the counter 2215 to the controller 2211, which thereby recognizes that the number of tone signals received has reached the prescribed number and shifts to a connection-established state. By configuring a communication apparatus in this way, it is possible to realize the operation shown in the timing chart of FIG. 21 described above, and thereby achieve a transition to a connection-established state without fail.

Figure 23:
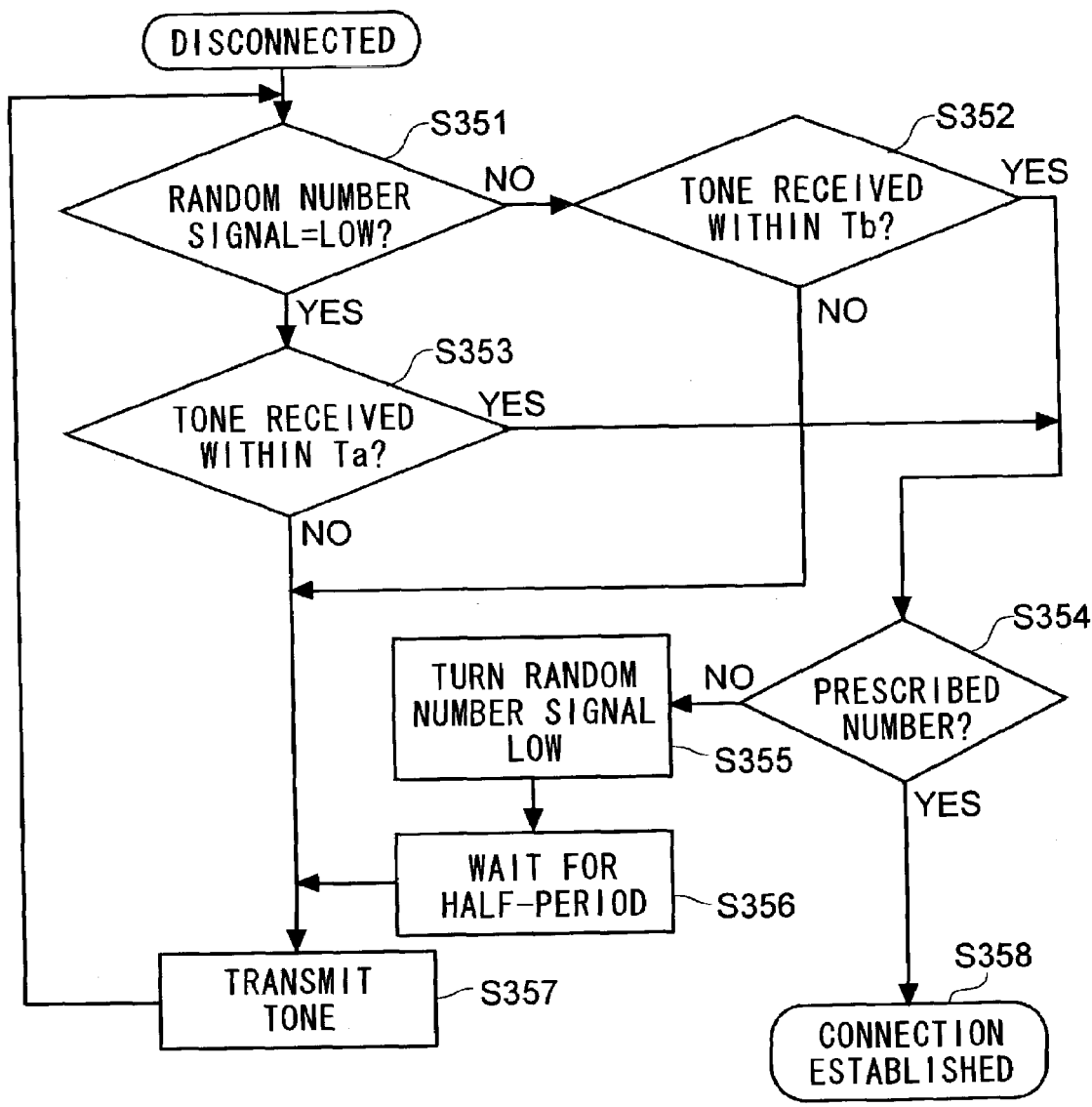
FIG. 23 is a flow chart of the procedure executed by an apparatus to establish connection in the ninth embodiment of the invention.

FIG. 23 is a flow chart showing the operation, on the occasion of a transition from a disconnected state to a connection-established state, of the communication apparatus configured as shown in FIG. 22.

When the home apparatus is in a disconnected state, in step S351, whether the random-number signal 2212 fed from the random number generator 2214 is low or not is checked. If the random-number signal 2212 is high, the procedure proceeds to step S352; if the random-number signal 2212 is low, the procedure proceeds to step S353.

In step S352, whether a tone signal is received within the period Tb or not is checked. The SD checker 2209 checks this, and feeds check signals 2210 and 2217 to the controller 2211 and the counter 2215, respectively. If a tone signal is recognized to have been received, the procedure proceeds to step S354, and, if no tone signal is recognized to have been received, the procedure proceeds to step S357.

In step S353, whether a tone signal is received within the period Ta or not is checked. The SD checker 2209 checks this, and feeds check signals 2210 and 2217 to the controller 2211 and the counter 2215, respectively. If a tone signal is recognized to have been received, the procedure proceeds to step S354, and, if no tone signal is recognized to have been received, the procedure proceeds to step S357.

In step S354, whether the number of tone signals received has reached the prescribed number or not is checked. The counter 2215 checks this, and feeds a signal 2213 to the controller 2211. If the prescribed number is recognized not to have been reached yet, the procedure proceeds to step S355, and, if the prescribed number is recognized to have been reached, the procedure proceeds to step S358 to effect a transition to a connection-established state.

In step S355, the random-number signal 2212 fed from the random number generator 2214 is turned low. This is achieved by feeding a signal 2216 from the controller 2211 to the random number generator 2214. The procedure then proceeds to step S356.

In step S356, after a lapse of a period (T/2) equal to half the period of the tone signal after the reception of the tone signal, the timing with which to transmit a tone signal is determined, and a wait lasts until the tone signal is transmitted. At the end of the wait, the procedure proceeds to step S357.

In step S357, a tone signal is transmitted. The tone generator 2202 generates a tone signal 2203, which is then converted into a transmitted signal 2205 and transmitted by the transmitter 2204. The procedure then proceeds to step S351.

In this way, on the occasion of a transition from a disconnected state to a connection-established state, the period of the tone signal is switched so that two communication apparatuses transmit tone signals with different timing. This permits both of the communication apparatuses to detect the tone signal from the partner apparatus, and thus helps achieve a transition to the connection-established state without fail.

ADVANTAGES OF THE INVENTION

According to the first embodiment of the invention, it is possible to determine a local parent-child relationship between the home and partner apparatuses immediately after the establishment of connection so as to make them use, according to the parent-child relationship so determined, different transmission methods. This makes it possible to detect disconnection even in optical two-way communication using a single optical fiber.

According to the second embodiment of the invention, even when the home and partner apparatuses start transmitting tones at almost the same time, it is possible to determine a local parent-child relationship between the home and partner apparatuses immediately after the establishment of connection so as to make them use different transmission methods. This makes it possible to detect disconnection even in optical two-way communication using a single optical fiber.

According to the third embodiment of the invention, it is possible to detect disconnection in optical two-way communication using a single optical fiber without determining a parent-child relationship or making the home and partner apparatuses use different transmission methods.

According to the fourth embodiment of the invention, in optical two-way communication using a single optical fiber, it is possible to detect the start of data communication by the partner apparatus on the basis of an SD signal, which conventionally tends to cause erroneous detection of the light emitted by the home apparatus itself under the influence of stray light.

According to the fifth embodiment of the invention, it is possible to switch the transmitted tone signals between two types according to whether a request for data communication occurring within the home apparatus or a request for data communication occurring within the partner apparatus is earlier. This makes it possible to determine a local parent-child relationship between the home and partner apparatuses during data communication. Thus, it is possible to make the home and partner apparatuses use different transmission methods.

According to the sixth embodiment of the invention, it is possible to determine a local parent-child relationship between the home and partner apparatuses when, after connection is established, both apparatuses shift to a data-transfer-enabled state as a result of a request for communication occurring in both of them. Thus, it is possible to make the home and partner apparatuses use different transmission methods.

According to the seventh embodiment of the invention, it is possible to make two apparatuses transmit tone signals with different timing according to the parent-child relationship between them. This makes it possible, when requests for data communication are cancelled in both apparatuses at the same time, to maintain a connection-established state without shifting from a data-transfer-enabled state to a disconnected state.

According to the eighth embodiment of the invention, it is possible, when requests for data communication are recognized to have been cancelled in both apparatuses, to make the two apparatuses transmit tone signals with different timing. Thus, irrespective of the timing with which the requests for data communication are cancelled, it is possible to maintain a connection-established state without shifting from a data-transfer-enabled state to a disconnected state.

According to the ninth embodiment of the invention, when connection is established, the period of the tone signal of the home apparatus is determined randomly until a tone signal from the partner apparatus is detected. This makes it possible to shift the timing with which the home apparatus receives a tone signal transmitted from the partner apparatus from the timing with which the home apparatus transmits a tone signal. This permits the home apparatus to receive a tone signal from the partner apparatus without fail. Thus, it is possible to reduce the time required by a transition from a disconnected state to a connection-established state in optical two-way communication using a single optical fiber.

What is claimed is:

1. A communication apparatus (A) that establishes connection with another communication apparatus (B) through exchange of tone signals, comprising:
    means for comparing a time point at which the communication apparatus (A) transmits a first tone signal with a time point at which the communication apparatus (A) receives a first tone signal from the communication apparatus (B) and
    means for determining, according to which of the time points is earlier, which to use of two sets of transmission properties with which the communication apparatus (A) is provided.

2. A communication apparatus (A) That establishes connection with another communication apparatus (B) through exchange of tone signals, comprising:
    means for securing at least two time periods within a time interval after The communication apparatus (A) transmits one tone signal until the communication apparatus (A) transmits the next tone signal,
    means for detecting in which of the two time periods the communication apparatus (A) receives a tone signal from the communication apparatus (B), and
    means for determining, according to which of the two time periods is detected, which to use of two sets of transmission properties with which the communication apparatus (A) is provided.

3. A communication apparatus (A) that establishes connection with another communication apparatus (B) through exchange of tone signals,
    comprising:
        means for detecting, after establishment of connection using a first tone signal, occurrence of a request for data communication within the communication apparatus (A) itself and then transmitting a predetermined second tone signal different from the first tone signal, and
        means for detecting reception of the second tone signal from the communication apparatus (B) and thereby recognizing occurrence of a request for data communication within the communication apparatus (B),
    wherein the communication apparatus (A) is further provided with
        means for comparing a time point at which the communication apparatus (A) transmits the second tone signal with a time point at which the communication apparatus (A) receives the second tone signal from the communication apparatus (B) and
        means for determining, according to which of the time points is earlier, which to use of two sets of transmission properties with which the communication apparatus (A) is provided.

4. A communication apparatus (A) that establishes connection with another communication apparatus (B) through exchange of tone signals,
    comprising:
        means for detecting, after establishment of connection using a first tone signal, occurrence of a request for data communication within the communication apparatus (A) itself and then transmitting a predetermined second tone signal different from the first tone signal, and
        means for detecting reception of the second tone signal from the communication apparatus (B) and thereby recognizing occurrence of a request for data communication within the communication apparatus (B),
    wherein the communication apparatus (A) is further provided with
        means for, when the communication apparatus (A) transmits the second tone signal before receiving the second tone signal from the communication apparatus (B), provisional choosing a predetermined set of transmission properties among a plurality of sets of transmission properties with which the communication apparatus (A) is provided, means for, when the communication apparatus (A) receives a continuous signal as a data signal from the communication apparatus (B) after the choice of the predetermined set of transmission properties, definitely deciding to use the predetermined set of transmission properties, and means for, when the communication apparatus (A) receives the second tone signal from the communication apparatus (B) before transmitting the second tone signal, deciding to use one of the other sets of transmission properties than the predetermined set of transmission properties.

5. A communication apparatus (A) as claimed in claim 4, wherein the communication apparatus (A) is further provided with means for comparing a time point at which the communication apparatus (A) transmits the second tone signal with a time point at which the communication apparatus (A) receives the second tone signal from the communication apparatus (B) and means for determining, according to which of the time points is earlier, which to use of two sets of transmission properties with which the communication apparatus (A) is provided.

6. A communication apparatus (A) that establishes connection with another communication apparatus (13) through exchange of tone signals, comprising:

means for detecting, after establishment of connection using a first tone signal, occurrence of a request for data communication within the communication apparatus (A) itself and then transmitting a predetermined second tone signal different from the first tone signal, and means for detecting reception of the second tone signal from the communication apparatus (B) and recognizing occurrence of a request for data communication within the communication apparatus (B), wherein the communication apparatus (A) is further provided with means for, when the communication apparatus (A) transmits the second tone signal before receiving the second tone signal from the communication apparatus (B), provisional choosing one of two sets of transmission properties with which the communication apparatus (A) is provided, means for, when the communication apparatus (A) receives a continuous signal as a data signal from the communication apparatus (B) after the choice of said one set of transmission properties, definitely deciding to use said one set of transmission properties, and means for, when the communication apparatus (A) receives the second tone signal from the communication apparatus (B) before transmitting the second tone signal, deciding to use the other set of transmission properties.

7. A communication apparatus (A) that establishes connection with another communication apparatus (B) through exchange of tone signals, comprising:

means for transitioning from a data-transfer-enabled state for exchanging data signals with the communication apparatus (B) by using one of a plurality of transmission properties to a connection-established state for exchanging tone signals as a result of cancellation of a request for communication from within the communication apparatus (A) itself, and means for, during said transitioning, determining when to start transmitting a tone signal according to the set of transmission properties that the communication apparatus (A) uses.

8. A communication apparatus (A) as claimed in claim 7, wherein the communication apparatus (A) determines when to start transmitting a tone signal after confirming that the communication apparatus (B) has completed transmission of a data signal.

9. A communication apparatus (A) that establishes connection with another communication apparatus (B) through exchange of tone signals, comprising:

means for presetting, provided a fundamental period of the tone signals T, two or more periods each within a range of from $T-\alpha$ to $T+\beta$, where $0 \leq \alpha \leq T$ and $0 \leq \beta \leq T$, as alternatives of a period with which the communication apparatus (A) transmits tone signals until connection with the communication apparatus (B) is established, and means for setting, until connection with the communication apparatus (B) is established, every time the communication apparatus (A) transmits a tone signal, by choosing one of said two or more periods, a period for which the communication apparatus (A) waits before transmitting the next tone signal, and transmits the next tone signal after a lapse of the chosen period.

10. A communication method in which connection between communication apparatuses is established through exchange of tone signals, comprising:

securing, for each of communication apparatuses that attempt to establish connection, at least two time periods within a time interval after the communication apparatus transmits a tone signal until the communication apparatus transmits the next tone signal, making a communication apparatus that receives a tone signal in a predetermined one of the two time periods during establishment of connection operate with a predetermined set of transmission properties among a plurality of sets of transmission properties after establishment of connection, and making a communication apparatus other than the communication apparatus that operates with the predetermined set of transmission properties operate with one of the other sets of transmission properties than the predetermined set of transmission properties after establishment of connection.

11. A communication method in which connection between communication apparatuses is established through exchange of tone signals, comprising:

securing, for each of said communication apparatuses that attempt to establish connection, at least two time periods within a time interval after the communication apparatus transmits a tone signal until the communication apparatus transmits the next tone signal, making a communication apparatus that receives a tone signal in a predetermined one of the two time periods during establishment of connection operate with one of two sets of transmission properties after establishment of connection, and making a communication apparatus other than the communication apparatus that operates with said one set of transmission properties operate with the other set of transmission properties after establishment of connection.

12. A communication method in which connection between communication apparatuses is established through exchange of tone signals, comprising:

exchanging a first tone signal to request establishment of connection, making, after establishment of connection, a communication apparatus within which a request for data communication has occurred transmit a second tone signal different from the first tone signal, so that another communication apparatus that has received the second tone signal recognizes that the request for data communication has occurred within the communication apparatus that has transmitted the second tone signal, provisionally setting a communication apparatus (A) that transmits the second tone signal before receiving the second tone signal to use a predetermined set of transmission properties among a plurality of sets of transmission properties, definitely setting, when the communication apparatus (A) provisionally set to use the predetermined set of transmission properties receives a continuous signal as a data signal from another communication apparatus (B), the communication apparatus (A) to use the predetermined set of transmission properties, and definitely setting the communication apparatus (B) that receives the second tone signal fast to use one of the other sets of transmission properties than the predetermined set of transmission properties.

13. A communication method in which connection between communication apparatuses is established through exchange of tone signals, comprising:

exchanging a first tone signal to request establishment of connection, making, after establishment of connection, a communication apparatus within which a request for data communication has occurred transmit a second tone signal different from the first tone signal, so that another communication apparatus that has received the second tone signal recognizes that the request for data communication has occurred within the communication apparatus that has transmitted the second tone signal, provisionally setting a communication apparatus (A) that transmits the second tone signal before receiving the second tone signal to use one of two sets of transmission properties, definitely setting, when the communication apparatus (A) provisionally set to use said one set of transmission properties receives a continuous signal as a data signal from another communication apparatus (B), the communication apparatus (A) to use said one set of transmission properties, and definitely setting the communication apparatus (B) that receives the second tone signal first to use the other set of transmission properties.

14. A communication method in which connection between communication apparatuses is established through exchange of tone signals, comprising:

canceling a request for communication in one of communication apparatuses that are performing data communication by exchanging data signals by using different sets of transmission properties, and determining when to start transmitting a tone signal according to the transmission properties that have been used by the one communication apparatus within which the request for communication was cancelled.

15. A communication method as claimed in claim 14, wherein when to start transmitting the tone signal is determined after the one communication apparatus within which the request for communication was cancelled confirms completion of transmission of a data signal by another of the communication apparatuses that have been performing data communication with the one communication apparatus within which the request for communication was cancelled.

16. A communication method in which connection between communication apparatuses is established through exchange of tone signals, comprising:

presetting, provided a fundamental period of the tone signals T, for each of communication apparatuses that attempt to establish connection, two or more periods each within a range of from T-$\alpha$ to T-$\beta$, where $0 \leq \alpha \leq T$ and $0 \leq \beta \leq T$, as alternatives of a period with which tone signals are transmitted until connection with another communication apparatus is established, and choosing, until connection with another communication apparatus is established, every as before a time a tone signal is transmitted, one of said two or more periods a period for which a wait lasts before transmission of the next tone signal so that the next tone signal is transmitted after a lapse of the chosen period.

* * * * *